United States Patent
Satou et al.

(10) Patent No.: US 7,268,314 B2
(45) Date of Patent: Sep. 11, 2007

(54) DISCHARGE-PROCESSING POWER SOURCE DEVICE

(75) Inventors: Seiji Satou, Tokyo (JP); Hiroyuki Ooguro, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 181 days.

(21) Appl. No.: 10/520,658

(22) PCT Filed: Jul. 12, 2002

(86) PCT No.: PCT/JP02/07107

§ 371 (c)(1),
(2), (4) Date: Jan. 10, 2005

(87) PCT Pub. No.: WO2004/007132

PCT Pub. Date: Jan. 22, 2004

(65) Prior Publication Data

US 2006/0054600 A1    Mar. 16, 2006

(51) Int. Cl.
*B23H 7/14* (2006.01)
*H02M 7/48* (2006.01)
(52) U.S. Cl. .............. 219/69.18; 219/69.13; 323/265; 323/283
(58) Field of Classification Search .......... 219/69.12, 219/69.13, 69.18; 323/265, 282, 283; 363/41
See application file for complete search history.

(56) References Cited

U.S. PATENT DOCUMENTS 5,021,936 A * 6/1991 Nishizawa et al. .......... 363/41
5,064,984 A   11/1991 Yamamoto et al.
5,539,178 A    7/1996 Taneda et al.

FOREIGN PATENT DOCUMENTS

| DE | 43 39 191 A1 | 7/1994 |
| EP | 0 707 915 A1 | 4/1996 |
| JP | 56-69034 A | 6/1981 |
| JP | 60-85826 A | 5/1985 |
| JP | 63-43576 A * | 2/1988 |
| JP | 63-262062 A * | 10/1988 |
| JP | 63-306821 A | 12/1988 |
| JP | 63-312018 A | 12/1988 |
| JP | 64-11713 A | 1/1989 |
| JP | 2-87975 A * | 3/1990 |
| JP | 3-92220 A | 4/1991 |
| JP | 3-104517 A | 5/1991 |
| JP | 4-87721 A | 3/1992 |
| JP | 4-105819 A | 4/1992 |

(Continued)

*Primary Examiner*—Geoffrey S. Evans
(74) *Attorney, Agent, or Firm*—Sughrue Mion pllc.

(57) ABSTRACT

A power supply device for electric discharge machining includes a switching circuit that supplies a discharge pulse current to an inter-electrode portion that is a portion between an electrode and a workpiece serving as another electrode arranged to be opposed to the electrode at a predetermined interval; and a pulse-width control unit that generates a control pulse signal of a predetermined pulse width in response to a detection signal for starting a discharge at the inter-electrode portion. The switching circuit includes a switching circuit including a switching element suitable for a high-speed operation and a switching circuit including a switching element suitable for a low-speed operation, and receives the control pulse signal in parallel.

15 Claims, 22 Drawing Sheets

FOREIGN PATENT DOCUMENTS

| | | |
|---|---|---|
| JP | 5-9209 B2 | 2/1993 |
| JP | 5-285730 A | 11/1993 |
| JP | 6-141542 A * | 5/1994 |
| JP | 6-141542 A | 5/1994 |
| JP | 7-1238 A | 1/1995 |
| JP | 8-118147 A | 5/1996 |
| JP | 11-48039 A | 2/1999 |
| JP | 11-267926 A | 10/1999 |
| JP | 2002-36030 A | 2/2002 |

* cited by examiner

FIG.1

| | SWITCHING ELEMENT (CAPACITY) | GATE INPUT CAPACITY | TURN-ON TIME | TURN-OFF TIME | MINIMUM PULSE WIDTH |
|---|---|---|---|---|---|
| 1 | FET1(500V,3A) | 330pF | 25nS | 50nS | 77nS |
| 2 | FET1(500V,10A) | 1050pF | 85nS | 135nS | 210nS |
| 3 | FET1(500V,30A) | 2800pF | 172nS | 300nS | 472nS |
| 4 | FET1(600V,75A) | 4100pF | 600nS | 800nS | 1400nS |
| 5 | IGBT MODULE (600V,400A) | 20000pF | 700nS | 1100nS | 1800nS |

DISCHARGE-PROCESSING POWER SOURCE DEVICE

TECHNICAL FIELD

The present invention relates to a power supply device for electric discharge machining used in a wire electric discharge machining apparatus that causes electric discharge between a wire electrode and a workpiece serving as the other electrode (hereinafter referred to as "inter-electrode portion") to subject the workpiece to wire electric discharge machining, and more particularly, to a power supply device for electric discharge machining used in a wire electric discharge machining apparatus that performs wire electric discharge machining compliant with a large current and a high frequency.

BACKGROUND ART

It is a well-known technique that wire electric discharge machining can be performed at high speed while preventing breaking of wire by applying large and small current pulses to an inter-electrode portion according to a state of the inter-electrode portion represented by a length of a no-load time. On the other hand, a repetition frequency in wire electric discharge machining is about 60 kilohertz to 100 kilohertz. However, when two kinds of large and small current pulses are applied, a ratio of occurrence of the respective current pulses are 50 percents for the large current pulse and about 50 percents for the small current pulse, and the repetition frequency of the large current pulse is 30 to 50 kilohertz.

In general, when current peaks of respective large and small current pulses are changed according to a length of a no-load voltage of a preliminary discharge pulse, if control is performed with a small current pulse (short circuit, immediate discharge) within a no-load time of 2 microseconds from voltage application and control is performed with a large current pulse (normal discharge) in a no-load time of 2 microseconds or more from voltage application, a ratio of occurrence of normal discharge is a value about ½ to ⅓ of a total pulse number. In addition, in short circuit or immediate discharge, occurrence of sludge tends to be time concentrated or position concentrated due to influence of flow of machining liquid or the like, and when occurrence of sludge is discharge concentrated, a repetition frequency increases.

FIG. 1 is a diagram showing a list of characteristic data concerning switching response times of switching elements with different rated capacities. In FIG. 1, three field effect transistors (FETs) 1 to 3, one insulated gate bipolar transistor (IGBT), and one IGBT module are shown as switching elements, and a "capacity", a "gate input capacity", a "turn-on time", a "turn-off time", and a "minimum pulse width" are indicated for the respective switching elements.

The FET 1 has the "capacity" of 500 volts and 3 amperes, the "gate input capacity" of 330 picofarads, the "turn-on time" of 25 nanoseconds, the "turn-off time" of 50 nanoseconds, and the "minimum pulse width" of 77 nanoseconds. The FET 2 has the "capacity" of 500 volts and 10 amperes, the "gate input capacity" of 1050 picofarads, the "turn-on time" of 85 nanoseconds, the "turn-off time" of 135 nanoseconds, and the "minimum pulse width" of 210 nanoseconds. The FET 3 has the "capacity" of 500 volts and 30 amperes, the "gate input capacity" of 2800 picofarads, the "turn-on time" of 172 nanoseconds, the "turn-off time" of 300 nanoseconds, and the "minimum pulse width" of 472 nanoseconds.

The IGBT has the "capacity" of 600 volts and 75 amperes, the "gate input capacity" of 4100 picofarads, the "turn-on time" of 600 nanoseconds, the "turn-off time" of 800 nanoseconds, and the "minimum pulse width" of 1400 nanoseconds. The IGBT modules has the "capacity" of 600 volts and 400 amperes, the "gate input capacity" of 20000 picofarads, the "turn-on time" of 700 nanoseconds, the "turn-off time" of 1100 nanoseconds, and the "minimum pulse width" of 1800 nanoseconds.

In general, a switching element tends to have longer switching response time when capacities of rated voltage and rate current are larger. In addition, as shown in FIG. 1, in general, a switching element having a smaller current capacity tends to have a smaller gate input capacity even if a rated voltage is the same. In other words, since smaller electric power is required for driving, an operation of the switching element can be performed at higher speed.

Since an element having a small ON resistance and small heat generation among the switching elements has a large gate input capacity, the switching element cannot perform a high-speed operation. In addition, since an element having a small gate input capacity and capable of performing a high-speed operation has a large ON resistance and a small maximum current capacity and also has a large heat value, there is a problem in that, for example, cooling of the element is costly and the element occupies a large space.

FIG. 2 is a circuit diagram showing an example of a structure of a conventional power supply device for electric discharge machining. FIG. 3 is a block diagram showing a structure of a power supply control circuit that controls to drive switching elements S11a and S11b of a power supply unit for machining discharge 101.

In FIG. 2, an electrode E consisting of a wire and a workpiece W serving as the other electrode are arranged to be opposed to each other at an appropriate interval in an electric discharge machining unit 100. A power supply unit for machining discharge 101 and a power supply unit for preliminary discharge 102 are provided with respect to this electric discharge machining unit 100.

The power supply unit for machining discharge 101 includes a variable DC power supply V11, switching elements (e.g., FETs) S11a and S11b, and diodes D11, D12, D13, and D14. The power supply unit for preliminary discharge 102 includes a variable DC power supply V21, a switching element (e.g., FET) S21, a resistor R21, and diodes D21 and D22.

In the power supply unit for machining discharge 101, a cathode electrode of the diode D11 and a source electrode of the switching element S11a are connected at a positive electrode terminal of the DC power supply V11. In addition, a source electrode of the switching element S11b and an anode electrode of the diode D12 are connected at a negative electrode terminal of the DC power supply V11.

A drain electrode of the switching element S11a is connected to a cathode electrode of the diode D12 and an anode electrode of the diode D13, and a cathode electrode of the diode D13 is connected to the workpiece W. A floating inductance L11 is present in a connection line for the cathode electrode of the diode D13 and the workpiece W.

A drain electrode of the switching element S1b is connected to an anode electrode of the diode D11 and a cathode electrode of the diode D14. A floating inductance L12 is present in a connection line for an anode electrode of the diode D14 and the electrode E.

In the power supply unit for preliminary discharge 102, a source electrode of a switching element S21 is connected to a positive electrode terminal of the DC power supply V21, and a drain electrode of the switching element S21 is connected to an anode electrode of the diode D21. A cathode electrode of the diode D21 is connected to the workpiece W. A floating inductance L21 is present in a connection line for the cathode electrode of the diode D21 and the workpiece W.

A cathode electrode of the diode D22 is connected to a negative electrode terminal of the DC power supply V21, and an anode electrode of the diode D22 is connected to the electrode E. A floating inductance L22 is present in a connection line for the anode electrode of the diode D22 and the electrode E. A stray capacitance C11 is present between the connection line for the cathode electrode of the diode D21 and the workpiece W and the connection line for the anode electrode of the diode D22 and the electrode E.

As shown in FIG. 3, the power supply control circuit, which controls to drive the switching elements S11a and S11b of the power supply unit for machining discharge 101, includes a discharge detecting circuit 13 that detects a discharge current flowing to an inter-electrode portion (W-E) 105, which is a part between the electrode E and the workpiece W, an oscillation control circuit 14 that receives a start instruction pulse signal PK from the discharge detecting circuit 13, and drive circuits 15a and 15b to which a control pulse signal PC is inputted in parallel from the oscillation control circuit 14. The switching element S11a and S11b are adapted to receive a drive pulse signal PD from the drive circuits 15a and 15b and apply a machining pulse signal PS to the inter-electrode portion (W-E) 105.

Next, operations of the conventional power supply device for electric discharge machining will be explained with reference to FIGS. 2 to 4. Note that FIG. 4 is a diagram explaining a principle of operation of the conventional power supply device for electric discharge machining shown in FIG. 1.

First, meaning of reference signs shown in FIGS. 2 and 3 will be explained. In FIG. 2, a current IWE10 flowing from the stray capacitance C11 to the electric discharge machining unit 100 is a discharge start current. A current IWE11 flowing from the power supply unit for machining discharge 101 to the electric discharge machining unit 100 is an electric discharge machining current. A current IWE22 flowing from the power supply unit for preliminary discharge 102 to the electric discharge machining unit 100 is a discharge maintenance current. A current IWE flowing from the workpiece W to the electrode E is an inter-electrode current. In addition VWE denotes an inter-electrode voltage.

In FIG. 3, reference signs tk, tc, td, ts denote times (delay times) required for processing for receiving inputs in the respective circuits and generating and outputting desired signals, respectively, and tr denotes a delay time obtained by summing up the delay times. In other words, the delay time tr is a time from the time when the discharge detecting circuit 13 detects occurrence of discharge in the inter-electrode portion (W-E) 105 of the electric discharge machining unit 100 until the time when the switching elements S11a and S11b can apply the machining pulse PS to the inter-electrode portion (W-E) 105. Note that the inter-electrode portion (W-E) 105 will be hereinafter simply represented as an inter-electrode portion.

Incidentally, in FIGS. 2 and 3, when the switching element S21 of the power supply unit for preliminary discharge 100 is turned ON in a state in which the inter-electrode portion between the electrode E and the workpiece W is not discharging and is not short-circuited, a voltage at the DC power supply V21 appears in the inter-electrode portion. At the same time, the stray capacitance C11 in the circuit is charged to the voltage at the DC power supply V21. Note that a distance between the electrode E and the workpiece W is controlled by a numerical control device and a servo drive control device, which are not shown in the figures, such that discharge occurs.

When discharge occurs in the inter-electrode portion due to an output voltage at the DC power supply V21, first, charges stored in the stray capacitance C1 in the circuit are capacitor-discharged to the inter-electrode portion, and the discharge start current IWE10 flows. Consequently, a conductive path is formed in the inter-electrode portion. To maintain this conductive path, since a current has to be caused to continue to flow to the inter-electrode portion even after the charges in the stray capacitance C11 in the circuit are fully discharged, the switching element S21 is kept ON.

As a result, the discharge maintenance current IWE22 flows in a path of the DC power supply V21→the switching element S21→the resistor R21→the diode D21→the floating inductance L21 in the circuit→the workpiece W→the electrode E→the floating inductance L22 in the circuit→the diode D22→the DC power supply V21, and the conductive path formed in the inter-electrode portion is maintained. At this point, since the discharge maintenance current IWE22 flows through the resistor R21, a maximum value of the discharge maintenance current IWE22 is limited to IWE22 (max)=V21/R21 by the resistor R21. Therefore, since this discharge maintenance current IWE22 has a relatively small current value and is weak as machining energy, the discharge maintenance current IWE22 has a role of a preliminary discharge current for causing the large electric discharge machining current IWE11 to flow. As described below, occurrence of discharge is detected according to the discharge maintenance current IWE22 appearing in the inter-electrode portion simultaneously with the occurrence of discharge, and the large electric discharge machining current IWE11, which is to be caused to flow to the inter-electrode portion, is outputted to the inter-electrode portion with a delay of a time tr from time t0 when the occurrence of discharge is detected.

In other words, the discharge detecting circuit 13 detects the drop of an inter-electrode voltage due to the occurrence of discharge in the inter-electrode portion and outputs the start instruction pulse signal PK for a large current output to an oscillation control circuit 14. The oscillation control circuit 14 outputs the control pulse signal PC of a pulse width, which is set according to a machining state in the inter-electrode portion, to the drive circuits 15a and 15b. At the same time, the drive circuit 15a drives to turn ON the switching element S11b according to the drive pulse signal PD in the same manner.

Here, when all the switching elements S11a, S11b, and S21 come into an ON operation state, a circuit, to which plural DC power supplies with different voltages are connected, is formed. In this case, elements in the circuit are likely to be destroyed due to a potential difference including a surge voltage. Thus, when the switching elements S11a and S11b are turned ON, the switching element S21 is turned ON as a safety measure.

In the power supply unit for machining discharge 101, the switching elements S11a and S11b perform an ON operation simultaneously, whereby the large electric discharge machining current IWE11 flows in a path of the DC power supply V11→the switching element S11a→the diode D13→the floating inductance L11 in the circuit→the workpiece W→the electrode E→the floating inductance L12 in the circuit→the diode D14→the switching element S11b→the DC power supply V11.

When the control pulse signal PC from the oscillation control circuit 14 disappears, the drive circuits 15a and 15b drive to turn OFF the switching elements S11a and S11b, respectively. At this point, the electric discharge machining current IWE11 is to be caused to continue to flow in the circuit by an inductive action of the floating inductances L11 and L12 in the circuit. As a result, the electric discharge machining current IWE11 returns to the DC power supply V11 in a path of the floating inductance L11 in the circuit→the workpiece W→the electrode E→the floating inductance L12 in the circuit→the diode D14→the diode D11→the DC power supply V11 and is regenerated.

Next, in FIG. 4, the switching element S21 (3) performs an ON operation, whereby an inter-electrode voltage VWE (1) changes to a certain voltage (voltage at the DC power supply V21), and the capacitor C11 is charged. When a discharge start current IWE10 (2) caused by discharge of the capacitor C11 starts flowing at the discharge start time t0, the inter-electrode voltage VWE (1) starts dropping. In addition, a discharge maintenance current IWE22 (4) starts flowing with a rising inclination of $V21/(L21+L22)$ affected by influence of the floating inductance L21 and L22.

The inter-electrode voltage VWE (1) reaches a lowest discharge voltage Va at certain time after the time tk has elapsed from the discharge start time t0 and maintains the discharge voltage Va after that. The discharge maintenance current IWE22 (4) reaches a predetermined value (IWE22(max)=V21/R21) around time when the discharge start current IWE10 (2) passes a peak value (certain time after the time tk has elapsed from the discharge start time t0). Then, when the time tr has elapsed from the discharge start time t0, since a switching element S11 (8) serving as the switching elements S11a and S11b performs an ON operation, the switching element S21 (3) maintains an ON operation state until the time tr elapses. Therefore, the discharge maintenance current IWE2 (4) maintains the predetermined value (IWE22(max)=V21/R21) in the time tr during which the switching element S21 (3) is performing the ON operation.

When the time tk has elapsed from the discharge start time t0, the discharge detecting circuit 13 detects drop of the inter-electrode voltage VWE (1) to a predetermined value or less and generates a start instruction pulse signal PK (5). This start instruction pulse signal PK (5) is outputted in a time largely exceeding the time tr in which the switching element S21 (3) is performing the ON operation. Subsequently, when a time (tk+tc) has elapsed from the discharge start time t0, the oscillation control circuit 14 generates a control pulse signal PC (6). This control pulse signal PC (6) is outputted in a time (td+ts).

Subsequently, when a time (tk+tc+td) has elapsed from the discharge start time t0, the drive circuits 15a and 15b generate a drive pulse signal PD (7). A generation period of this drive pulse signal PD (7) is the same as a generation period of the control pulse signal PC (6). Finally, when a time (tk+tc+td+ts) has elapsed from the discharge start time t0, that is, when the time tr has elapsed from the discharge start time t0, a switching element S11 (8) serving as the switching elements S11a and S11b performs an ON operation, and a machining pulse signal PS is outputted. A period in which the switching element S11 (8) performs the ON operation is the same as the generation period of the drive pulse signal PD (7).

When the switching element S11 (8) performs the ON operation, an electric discharge machining current IWE11 (9) starts flowing. Since the electric discharge machining current IWE11 (9) flows through the floating inductances L11 and L12, the electric discharge machining current IWE11 (9) continues to rise with an inclination of $V11/(L11+L12)$ in a period in which the switching element S11 (8) is in an ON operation state. Usually, since a voltage at the DC power supply V11 is two to three times as high as a voltage at the DC power supply V21, a rising inclination of the electric discharge machining current IWE11 (9) is steeper than a rising inclination of the discharge maintenance current IWE22 (4). When the switching element S11 (8) performs an OFF operation, the electric discharge machining current IWE11 (9) turns to drop.

Eventually, the inter-electrode current IWE (10) changes to IWE=IWE10+IWE22+IWE11. In other words, a period of a time difference between the first discharge start current IWE10 (2) and the final large electric discharge machining current IWE11 (9) is joined by the discharge maintenance current IWE22 (4) outputted from the power supply unit for preliminary discharge 102. Consequently, electric discharge machining can be performed repeatedly while a discharge state in the inter-electrode portion is maintained.

Here, when the FET 2 shown in FIG. 1 is used as the switching elements S11a and S11b, the delay time tr from the discharge start time t0 until the electric discharge machining current IWE11 appears in the inter-electrode portion is usually about 410 nanoseconds. In addition, a pulse width of capacitor discharge of the discharge start current IWE10 is about 360 nanoseconds. In 50 nanoseconds that is a difference between the delay time tr and the pulse width, although it is likely that discharge is cut off if this state is not changed, since the discharge maintenance current IWE22 flows as described above, the inter-electrode current IWE is never cut off.

However, in the conventional power supply device for electric discharge machining, an upper limit value of the discharge maintenance current IWE22 is limited by the resistor R21. In addition, a current value is reduced by the floating inductances L21 and L22 in the circuit in an initial stage of a transient state. Therefore, there is a problem in that the conductive path in the inter-electrode portion formed after occurrence of discharge cannot be maintained, and input of the electric discharge machining current IWE11 fails.

In particular, in a large wire electric discharge machining apparatus, since a distance between an inter-electrode portion and a power supply device in an electric discharge machining unit in the wire electric discharge machining apparatus is long, a power supply cable connecting the inter-electrode portion and the power supply deice is also long. As a result, a floating inductance in a circuit increases, and the discharge maintenance current IWE22 may not rise even after the discharge start current IWE10 disappears. Thus, a conductive path formed in the inter-electrode portion is cut off.

In addition, in the resistor R21, an inductance component due to a resistance winding is present, and an inductance also increases to obtain a necessary resistance. When the inductance of the resistor increases in this way, the rising of the discharge maintenance current IWE22 is further prevented. The first discharge start current IWE10 is a current due to capacitor discharge and actually includes an oscillation component. Therefore, even if a maximum value of the discharge maintenance current IWE22 is set somewhat large in advance, the discharge maintenance current IWE22 is offset by a component on a negative side of this oscillation, and the conductive path formed in the inter-electrode portion is cut off.

If the conductive path in the inter-electrode portion secured by the discharge start current IWE10 is cut off in this way before the electric discharge machining current IWE11 is inputted, an action of supplying the electric discharge machining current IWE11 stably using the discharge maintenance current IWE22 serving as a preliminary discharge current is not obtained. Thus, various failures occur in electric discharge machining.

In short, in a state in which the conductive path in the inter-electrode portion is cut off, since an output terminal of the power supply unit for machining discharge 101 is in an opened state, the electric discharge machining current IWE11 does not flow. Normal electric discharge machining is not performed in this case. When frequency of occurrence of such a state increases, the number of times of effective discharge decreases. As a result, there is a problem in that machining speed, which should be obtained originally, cannot be obtained, and further improvement of the machining speed cannot be realized.

Since a voltage at the DC power supply V11 is usually set two to three times as large as a voltage at the DC power supply V21 to output a large current in a short time. However, when there is no conductive path in the inter-electrode portion and the DC power supply V11 is in an opened state, a high voltage at this DC power supply V11 is applied to the inter-electrode portion. As a result, discharge is caused by this high voltage anew, and a large current flows to the inter-electrode portion suddenly without preliminary discharge. As a result, when a wire electrode is thin, the wire electrode is broken. Even if breakage does not occur in the wire electrode, there is a problem in that, for example, a machining surface is roughened, machining accuracy is deteriorated, and stable electric discharge machining characteristics cannot be obtained.

Concerning the problems as described above, Japanese Patent Application Publication No. H5-9209 (power supply for wire cut electric discharge machining apparatus) points out the same problems and, as a solution for the problems, discloses a technique for providing a circuit, in which an inductance and a capacitor are connected in series, in parallel with an inter-electrode portion and maintaining a conductive path of the inter-electrode portion after occurrence of discharge, that is, keeping a discharge state stably to prevent decline in machining efficiency. However, in this measure, since an excess capacitor is added in the inter-electrode portion eventually, for example, an electric capacitance viewed from a power supply device side increases according to a stray capacitance in the circuit, a rising time constant at the time when an output voltage is applied to the inter-electrode portion increases, and rising of an inter-electrode voltage is delayed. Consequently, since a voltage application time until discharge is caused becomes long, there is a disadvantage in that the number of times of effective discharge decreases and the machining efficiency cannot be improved sufficiently.

In addition, in the power supply for wire cut electric discharge machining apparatus disclosed in Japanese Patent Application Publication No. H5-9209, a peculiar oscillation frequency is obtained according to values of the inductance and the capacitor to be added. However, in recent years, a power supply device for electric discharge machining of a bipolar type, which alternately changes a polarity of a voltage applied to an inter-electrode portion to output oscillation, is mainly used. In this case, the added capacitor repeats charging and discharging operations according to at least an oscillation frequency of voltage application. A dielectric loss is present even in a capacitor for a high-frequency application. Therefore, in the technique disclosed in Japanese Patent Application Publication No. H5-9209, in addition to a problem of limiting the oscillation frequency of voltage application, there is also a problem in that heat generation occurs due to the dielectric loss, and a loss of supply energy is also caused.

The present invention realizes a large current and a high frequency necessary for high-speed machining such that both the large current and the high frequency can be attained. As prior examples concerning this point, for example, there are Japanese Patent Application Laid-Open No. H11-48039 (electric discharge machining power supply device for electric discharge machine), Japanese Patent Application Laid-Open No. S64-11713 (electric discharge machining power supply), and Japanese Patent Application Laid-Open No. H8-118147 (electric discharge machining power supply control device for wire electric discharge machine).

Japanese Patent Application Laid-Open No. H1-48039 (electric discharge machining power supply device for electric discharge machine) and Japanese Patent Application Laid-Open No. S64-11713 (electric discharge machining power supply) disclose a technique for supplying a large current to a machining gap but do not examine efficiency of a circuit and a heat loss. In other words, there is a problem in that, when a switching element excellent in a low-loss characteristic with a large current capacity is used to improve a heat loss and switching efficiency at the time when a large current is supplied, a gate input capacity is increased, a rising characteristic of a turn current is deteriorated, arc cut-off easily occurs, and wire breakage occurs frequently.

Japanese Patent Application Laid-Open No. H8-118147 (electric discharge machining power supply control device for wire electric discharge machine) discloses a technique for preventing wire breakage more surely by applying three kinds of large, medium, and small current pulses. However, since the power supply control device includes identical switching elements and drive circuits, for example, when a thick wire electrode of φ0.35 or the like is used, it is necessary to increase the number of parallels of switching elements. Thus, there is a problem in that cost increases and a power supply device cannot be reduced in size.

In short, in conventional examples including the prior examples described above, there is a problem in that, although a large current can be supplied, when a discharge frequency increases, an energy loss of a switching element increases rapidly, and the switching element is thermally broken. There is also a problem in that, even if the switching element is not thermally broken, it is necessary to excessively increase a capacity of a thermal converter to protect the switching element from an increased switching loss, and reduction in cost and reduction in size of a power supply device cannot be realized. For example, it is difficult to use a switching element, which has a low loss and is suitable for large current supply, like an IGBT in an area in which a repetition frequency is high (e.g., 40 kilohertz). Since, in general, a small current capacity switching element has a large ON resistance, a heat loss increases excessively when an ON time is long, and discharge treatment is costly.

The present invention has been devised in view of the problems described above, and it is an object of the present invention to obtain a power supply device for electric discharge machining in which switching circuits include two types of switching circuits with different characteristics, wire electric discharge machining coping with a large current and a high frequency can be performed efficiency with the switching circuit, and the number of switching elements and a heat value of the switching elements can be reduced.

DISCLOSURE OF THE INVENTION

It is an object of the present invention to solve at least the problems in the conventional technology.

A power supply device for electric discharge machining according to one aspect of the present invention includes a switching circuit that supplies a discharge pulse current to an inter-electrode portion that is a portion between an electrode and a workpiece serving as another electrode arranged to be opposed to the electrode at a predetermined interval; and a pulse-width control unit that generates a control pulse signal of a predetermined pulse width in response to a detection signal for starting a discharge at the inter-electrode portion. The switching circuit includes a switching circuit including a switching element suitable for a high-speed operation and a switching circuit including a switching element suitable for a low-speed operation, and receives the control pulse signal in parallel.

A power supply device for electric discharge machining according to another aspect of the present invention includes a switching circuit that supplies a discharge pulse current to an inter-electrode portion that is a portion between an electrode and a workpiece serving as another electrode arranged to be opposed to the electrode at a predetermined interval; and a pulse-width control unit that generates a control pulse signal of a predetermined pulse width in response to a detection signal for starting a discharge at the inter-electrode portion. The switching circuit includes a switching circuit including a switching element suitable for a high-speed operation; and a switching circuit including a switching element suitable for a low-speed operation, and receives the control pulse signal in parallel. The switching circuit includes a first switching circuit that receives a detection signal for discharge start in the inter-electrode portion; and a second switching circuit that receives a control pulse signal of a predetermined pulse width generated in response to the discharge start. The first switching circuit includes either of the switching element suitable for the high-speed operation and the switching element suitable for the low-speed operation. The second switching circuit includes the switching element suitable for the low-speed operation.

A power supply device for electric discharge machining according to still another aspect of the present invention includes a first pulse-width control unit and a second pulse-width control unit that generate a control pulse signal of a first pulse width and a control pulse signal of a second pulse width, respectively, in response to starting of a discharge in an inter-electrode portion that is a portion between an electrode and a workpiece serving as another electrode arranged to be opposed to the electrode at a predetermined interval; a first switching circuit that receives the control pulse signal of the first pulse width and supplies a discharge pulse current to the inter-electrode portion, the first switching circuit including a first switching circuit that includes a switching element suitable for a low-speed operation; a second switching circuit that receives the control pulse signal of the second pulse width and supplies a discharge pulse current to the inter-electrode portion, the switching circuit including a second switching circuit that includes a switching element suitable for a high-speed operation; a discharge-state judging unit that judges a discharge state at a time of starting the discharge in the inter-electrode portion from among a normal discharge state, an immediate discharge state, and a short circuit state; and a current-pulse selecting unit that issues an output instruction to the first pulse-width control unit when the discharge-state judging unit judges that the discharge state is the normal discharge state, and issues an output instruction to the second pulse-width control unit when the discharge-state judging unit judges that the discharge state is either of the immediate discharge state and the short circuit state.

A power supply device for electric discharge machining according to still another aspect of the present invention includes a first pulse-width control unit and a second pulse-width control unit that generate a control pulse signal of a first pulse width and a control pulse signal of a second pulse width, respectively, in response to starting of a discharge in an inter-electrode portion that is a portion between an electrode and a workpiece serving as another electrode arranged to be opposed to the electrode at a predetermined interval; a first switching circuit that receives the control pulse signal of the first pulse width and supplies a discharge pulse current to the inter-electrode portion, the first switching circuit including a first switching circuit that includes a switching element suitable for a low-speed operation; a second switching circuit that receives the control pulse signal of the second pulse width and supplies a discharge pulse current to the inter-electrode portion, the switching circuit including a second switching circuit that includes a switching element suitable for a high-speed operation; a discharge-state judging unit that judges a discharge state at a time of starting the discharge in the inter-electrode portion from among a normal discharge state, an immediate discharge state, and a short circuit state; and a current-pulse stop unit that issues an output stop instruction to the first pulse-width control unit when the discharge-state judging unit judges that the discharge state is either of the immediate discharge state and the short circuit state.

BRIEF DESCRIPTION OF THE DRAWINGS

FIG. 1 is a diagram of a list of characteristic data concerning switching response times of switching elements with different rated capacitances;

BEST MODE FOR CARRYING OUT THE INVENTION

Exemplary embodiments of a power supply device for electric discharge machining according to the present invention will be explained in detail with reference to the accompanying drawings.

Figure 5:
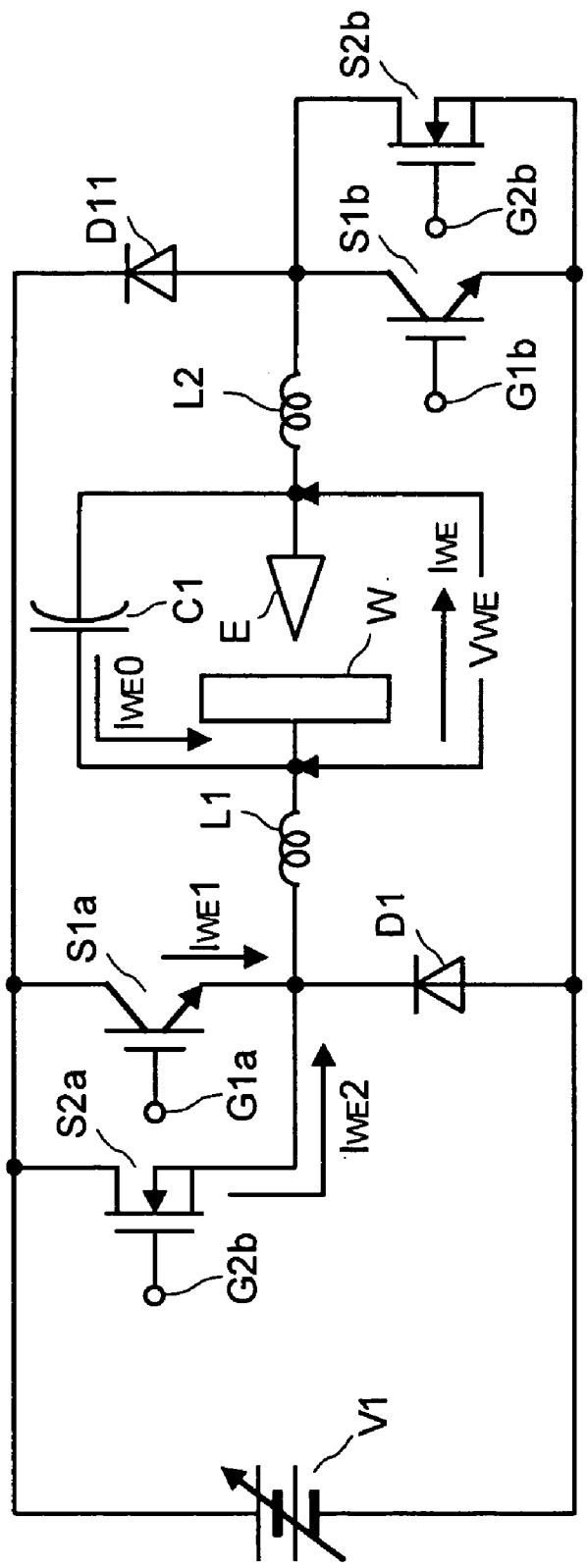
FIG. 5 is a circuit diagram of a main structure of a power supply device for electric discharge machining that is a first embodiment of the present invention.
Figure 6:
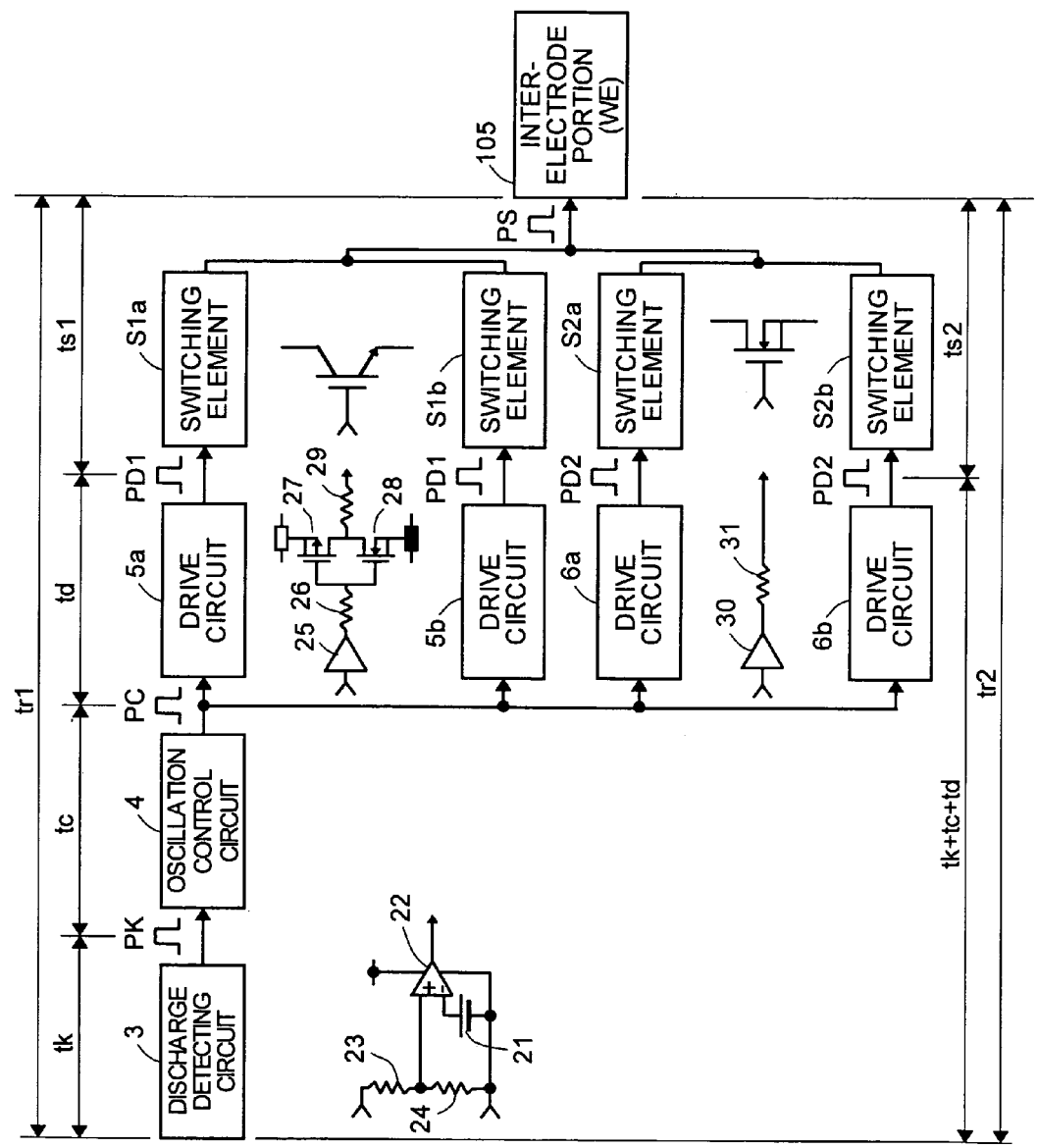
FIG. 6 is a block diagram of a structure of a power supply control circuit that controls to drive switching elements of the power supply device for electric discharge machining shown in FIG. 5.

FIG. 5 is a circuit diagram of a main structure of a power supply device for electric discharge machining that is a first embodiment of the present invention. FIG. 6 is a block diagram of a structure of a power supply circuit that controls to drive switching elements of the power supply device for electric discharge machining shown in FIG. 5.

In FIG. 5, an electrode E and a workpiece W are arranged at an appropriate interval in an electric discharge machining unit. A DC voltage (inter-electrode voltage) can be applied between the electrode E and the workpiece W from the outside at the time when discharge is started. Note that a stray capacitance C1 is present between the electrode E and the workpiece W.

A variable DC power supply V1, switching elements Sa1, S1$b$, S2$a$, and S2$b$, and diodes D1 and D2 are arranged with respect to the electrode E and the workpiece W. Here, an element suitable for a large current and a low-loss (e.g., IGBT) is used for the switching elements S1$a$ and S1$b$. In addition, an element suitable for a high-speed operation (e.g., FET) is used for the switching elements S2$a$ and S2$b$.

One signal electrodes of the switching elements S2$a$ and S1$a$ connected in parallel and a cathode electrode of the diode D2 are connected to a positive terminal of the DC power supply V1. In addition, one signal electrodes of the switching elements S1$b$ and S2$b$ connected in parallel and an anode electrode of the diode D1 are connected to a negative terminal of the DC power supply V1.

The other signal electrodes of the switching elements S2$a$ and S1$a$ connected in parallel are connected to the workpiece W together with a cathode electrode of the diode D1. A floating inductance L1 is present in this connection line. The other signal electrodes of the switching elements S1$b$ and S2$b$ connected in parallel are connected to the electrode E together with an anode electrode of the diode D2. A floating inductance L2 is present in this connection line.

As shown in FIG. 6, the power supply control circuit, which controls to drive the switching elements S1$a$, S1$b$, S2$a$, and S2$b$, includes a discharge detecting circuit 3 that detects a discharge current flowing to an inter-electrode portion (W-E) 105 that is a portion between the electrode E and the workpiece E, an oscillation control circuit 4 that receives a start instruction pulse signal PK from the discharge detecting circuit 3, and drive circuits 5$a$, 5$b$, 6$a$, and 6$b$ to which a control pulse signal PC is inputted in parallel from the oscillation control circuit 4. The switching elements S1$a$ and S1$b$ receive a drive pulse signal PD1 from the drive circuits 5$a$ and 5$b$ and the switching elements S2$a$ and S2$b$ receive a drive pulse signal PD2 from the drive circuits 6$a$ and 6$b$ to apply a machining pulse signal PS to the inter-electrode portion (W-E) 105, respectively.

The discharge detecting circuit 3 includes, for example, a reference voltage 21, a comparator 22, and a series circuit of resistance elements 23 and 24 for dividing an inter-electrode voltage VWE. The discharge detecting circuit 3 gives a divided voltage at the series circuit of the resistance elements 23 and 24 to a positive phase input terminal (+) of the comparator 22 and gives the reference voltage 21 to a negative phase input terminal (−) of the comparator 22. When the inter-electrode voltage VWE drops from an initial value to the reference voltage 21 or less, an output level of the comparator is reversed, whereby the discharge detecting circuit 3 detects discharge start in the inter-electrode portion.

The drive circuits 5$a$ and 5$b$ include, for example, a buffer 25 to which the control pulse signal PC is inputted, a driver consisting of two transistors 27 and 28 to which an output of the buffer 25 is inputted via a resistance element 26, and a resistance element 29 that connects an output terminal of the driver and control terminals of the switching elements S1$a$ and S1$b$. The driver circuits 6$a$ and 6$b$ include, for example, a buffer 30 to which the control pulse signal PC is inputted and a resistance element 31 that connects an output terminal of the buffer 30 and control terminals of the switching elements S2$a$ and S2$b$.

Figure 7:
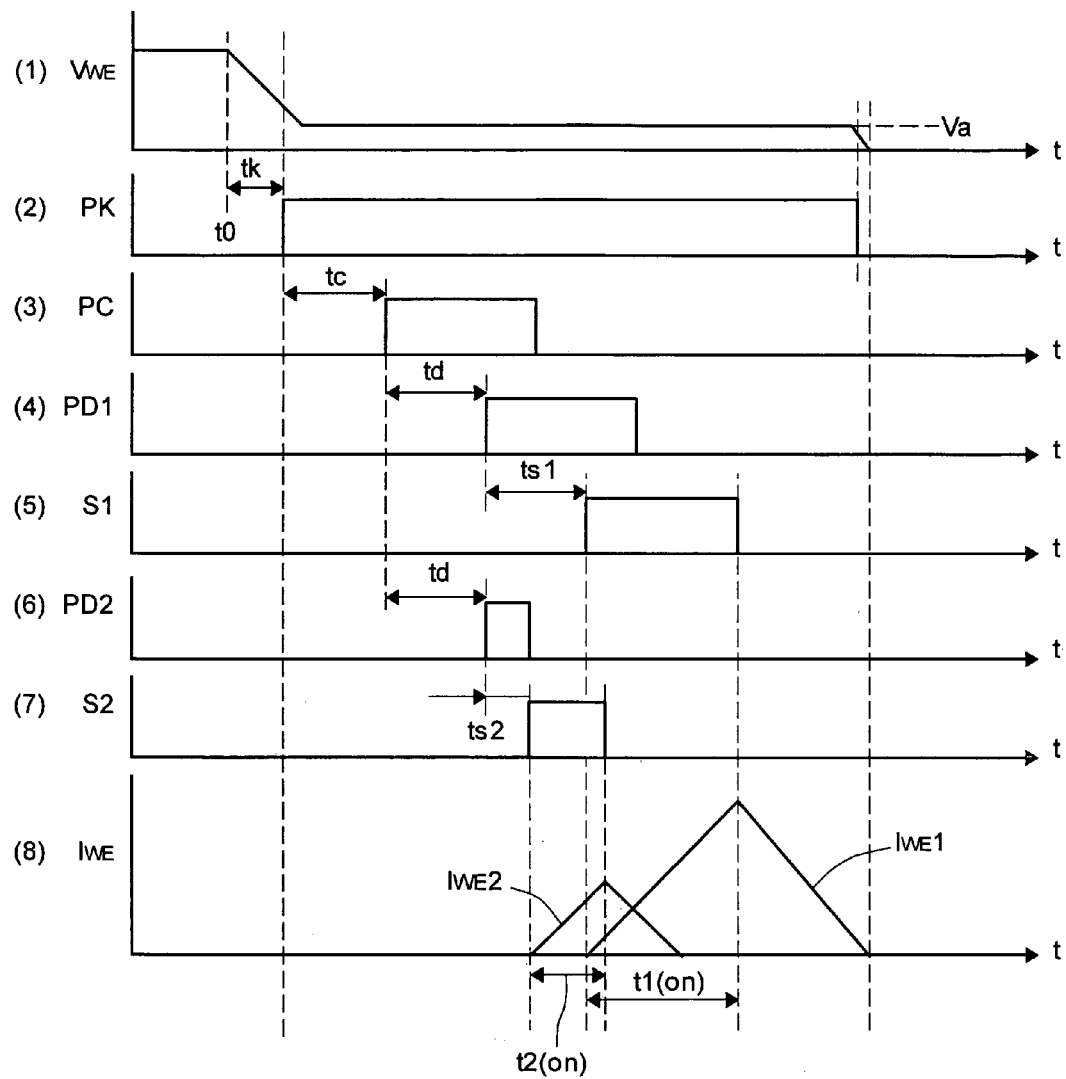
FIG. 7 is a diagram explaining a principle of operation of the power supply device for electric discharge machining by the power supply control circuit shown in FIG. 6.
Figure 8:
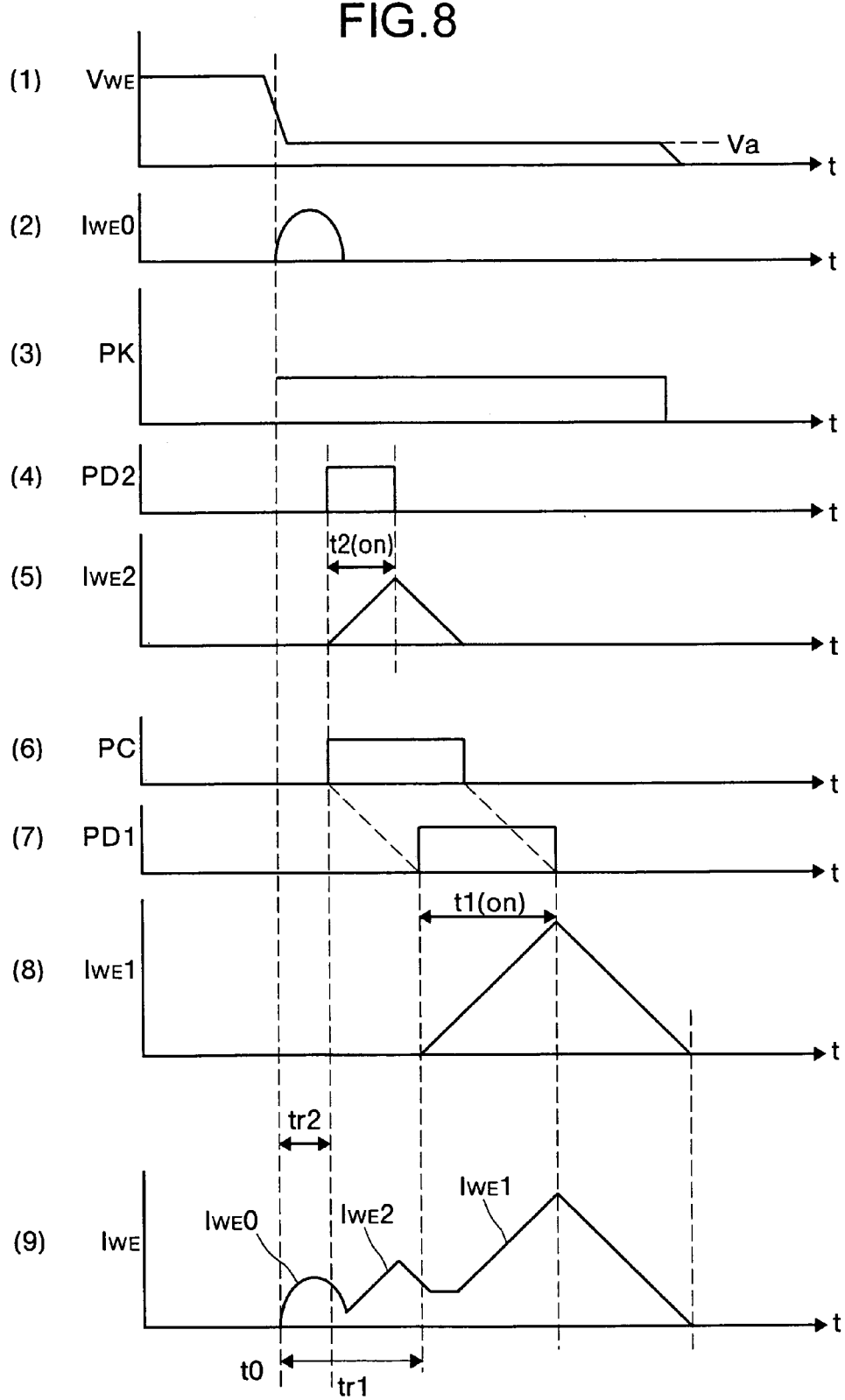
FIG. 8 is a diagram showing operation waveforms of respective portions of the power supply device for electric discharge machining that is actuated by the power supply control circuit shown in FIG. 6.
Figure 9:
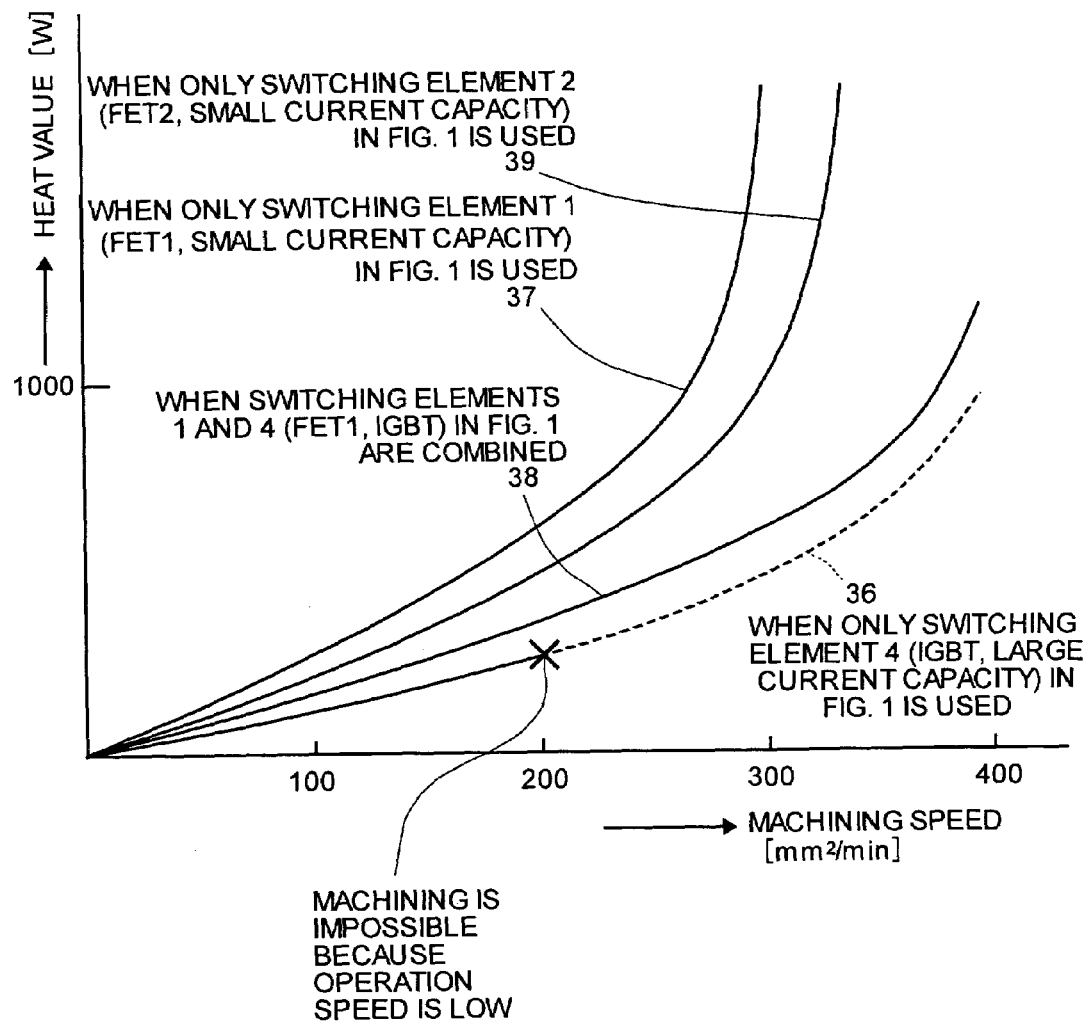
FIG. 9 is a diagram explaining a relation between a heat value and machining speed at the time when the switching elements shown in FIG. 1 are used.

Next, operations of the power supply device for electric discharge machining according to the first embodiment will be explained with reference to FIGS. 5 to 9. Note that FIG. 7 is a diagram explaining a principle of operation of the power supply device for electric discharge machining by the power supply control circuit shown in FIG. 6. FIG. 8 is a diagram of operation waveforms of respective portions of the power supply device for electric discharge machining according to the power supply control circuit shown in FIG. 6. FIG. 9 is a diagram explaining a relation between a heat value and machining speed at the time when the switching elements shown in FIG. 1 are used.

First, meanings of reference signs shown in FIGS. 5 and 6 will be explained. In FIG. 5, a current IWE0 flowing from the stray capacitance C1 to the workpiece W is a discharge start current. A current IWE1 flowing from one signal electrode to the other signal electrode in the switching element S1a (S1b) is an electric discharge machining current. A current IWE2 flowing from one signal electrode to the other signal electrode in the switching element S2a (S2b) is a discharge maintenance current. A current IWE flowing from the workpiece W to the electrode E is an inter-electrode current. VWE indicates an inter-electrode voltage.

In FIG. 6, reference signs tk, tc, and tc denote times (delay times) required for processing for receiving inputs in the circuits and generating and outputting desired signals, respectively. Reference sign ts1 denotes a delay time in the switching elements S1a and S1b. Reference sign ts2 denotes a delay time in the switching elements S1a and S1b. Reference sign tr1 denotes a delay time from a point when discharge occurs (time t0) until a point when a large electric discharge machining current IWE1 appears in the inter-electrode portion. Reference sign tr2 denotes a delay time from a point when discharge occurs (time t0) until a point when the discharge maintenance current IWE2 appears in the inter-electrode portion.

In FIGS. 5 to 7, a predetermined inter-electrode voltage VWE is applied to the inter-electrode portion from another power supply device, which is not shown in the figure, to bring the inter-electrode portion into a state in which discharge can be performed. Consequently, capacitor discharge due to the stray capacitance C1 in the circuit occurs, and the discharge start current IWE0 appears in the inter-electrode portion. The inter-electrode voltage VWE drops rapidly and stabilizes at a lowest discharge voltage Va after the time tk has elapsed from the discharge start time t0 ((1) in FIG. 7).

When the discharge detecting circuit 3 detects the inter-electrode voltage VWE dropping to be lower than the reference voltage 21 with the comparator 21 and detects occurrence of discharge in the inter-electrode portion, the discharge detecting circuit 3 outputs the oscillation start instruction pulse signal PK to the oscillation control circuit 4 after the delay time tk from a point of the detection (discharge start time t0). The oscillation start instruction pulse PK is outputted until the inter-electrode voltage VWE disappears ((2) in FIG. 7). The oscillation control circuit 4 receives the oscillation start instruction pulse signal PK and outputs the control pulse signal PC of a pulse width set in advance to the drive circuits 5a, 5b, 6a, and 6b after the delay time tc according to a machining state in the inter-electrode portion ((3) in FIG. 7).

Consequently, the drive circuits 5a and 5b output the drive pulse signal PD1 having a predetermined pulse width to the switching elements S1a and S1b to drive to turn ON the switching elements S1a and S1b after the delay time td ((4) in FIG. 7). The switching elements S1a and S1b come into an ON operation state for a fixed period t1 (on) after the delay time ts1 ((5) in FIG. 7). Since the current IWE1 flowing in the switching elements S1a and S1b appears in the inter-electrode portion through the floating inductances L1 and L2, the current IWE1 continues rising with a certain inclination in the fixed period t1 (on) and turns to drop simultaneously with end of the fixed period t1 (on) ((8) in FIG. 7).

The drive circuits 6a and 6b output the drive pulse signal PD2 having a predetermined pulse width to the switching elements S2a and S2b to drive to turn ON the switching elements S2a and S2b after the delay time td ((6) in FIG. 7). The switching elements S2a and S2b come into an ON operation state for a fixed period t2 (on) after the delay time ts2 ((7) in FIG. 7). Since the current IWE2 flowing in the switching elements S2a and S2b appears in the inter-electrode portion through the floating inductances L1 and L2, the current IWE2 continues rising with a certain inclination in the fixed period t2 (on) and turns to drop simultaneously with end of the fixed period t2 (on) ((8) in FIG. 7).

Here, since the switching elements S1a and S1b are elements suitable for a large current and a low loss, it is necessary to set the delay time ts1 large and the period in which the switching elements S1a and S1b are in the ON operation state (t1 (on)) also large. On the other hand, since the switching elements S2a and S2b are elements suitable for a high-speed operation, the delay time ts1 may be small, and the period in which the switching elements S2a and S2b are in the ON operation state (t2 (on)) may also be small. As shown in (5) and (7) in FIG. 7, the delay time ts1 of the switching elements S1a and S1b and the delay time ts2 of the switching elements S2a and S2b are in a relation of ts1>ts2.

As shown in (4) and (6) in FIG. 7, pulse widths of the drive pulse signals PD1 and PD2 are in a relation of PD1>PD2. Although, the pulse width of the drive pulse signal PD1 is the same as the pulse width of the control pulse signal PC outputted by the oscillation control circuit 4, end time thereof can be changed and set from the outside. On the other hand, a fixed value may be used for the pulse width of the drive pulse signal PD2 because of a role of the drive pulse signal PD2.

As a result, as shown in (8) in FIG. 7, first, a current IME2 flowing in the switching elements S2a and S2b appears as the inter-electrode current IME after elapse of the time tr2 (tk+tc+td+ts2=tr2). Thereafter, the current IME1 flowing in the switching elements S1a and S1b appears after elapse of the time tr1 (tk+tc+td+ts1=tr1). It is seen that the current IME2 corresponds to the discharge maintenance current IWE22 explained in the conventional example, and the current IME1 corresponds to the large electric discharge machining current IWE11 explained in the conventional example.

Then, by adjusting time positions and sizes of the period in which the switching elements S1a and Sb1 are in the ON operation state (t1 (on)) and the period in which the switching elements S2a and S2b are in the ON operation state (t2 (on)), as shown in (8) in FIG. 7, the discharge maintenance current IWE2 and the electric discharge machining current IWE1 are generated to have a large overlapping part.

In FIG. 8, operation waveforms in portions related to the inter-electrode current IWE explained above are extracted and shown. In FIG. 8, when the predetermined inter-electrode voltage VWE is applied to the inter-electrode portion (1), the discharge start current IWE0 flows (2), and the discharge detecting circuit 3 outputs the start instruction pulse signal PK at the discharge start time t0 when the discharge detecting circuit 3 detects drop of the inter-electrode voltage VWE (3). A point when the time tr2 has elapsed from the discharge start time t0 is about a point when the discharge start current IWE0 passes a peak value (9).

At a point when the time tr2 has elapsed from the discharge start time t0, the switching elements S2a and S2b comes into the ON operation state for the fixed time t2 (on) according to the drive pulse signal PD2 (4), and the discharge maintenance current IWE2 flows (5). This discharge maintenance current IWE2 starts flowing to replace the discharge start current IWE0 at a point when the discharge start current IWE0 has passed the peak value and drops to a certain value (9).

The control pulse signal PC outputted by the oscillation control circuit 4 has a pulse width set in advance (6), and the drive pulse signal PD1 is generated with the same pulse width (7). At a point when the time tr1 has elapsed from the discharge start time t0, the switching elements S1a and S1b come into the ON operation state for the fixed period t1 (on) according to the drive pulse signal PD1 (7), and the electric discharge machining current IWE1 flows (8). This electric discharge machining current IW1 starts flowing replacing the discharge maintenance current IWE2 at about a point when the discharge maintenance current IWE2 turns to drop (9).

Figure 4:
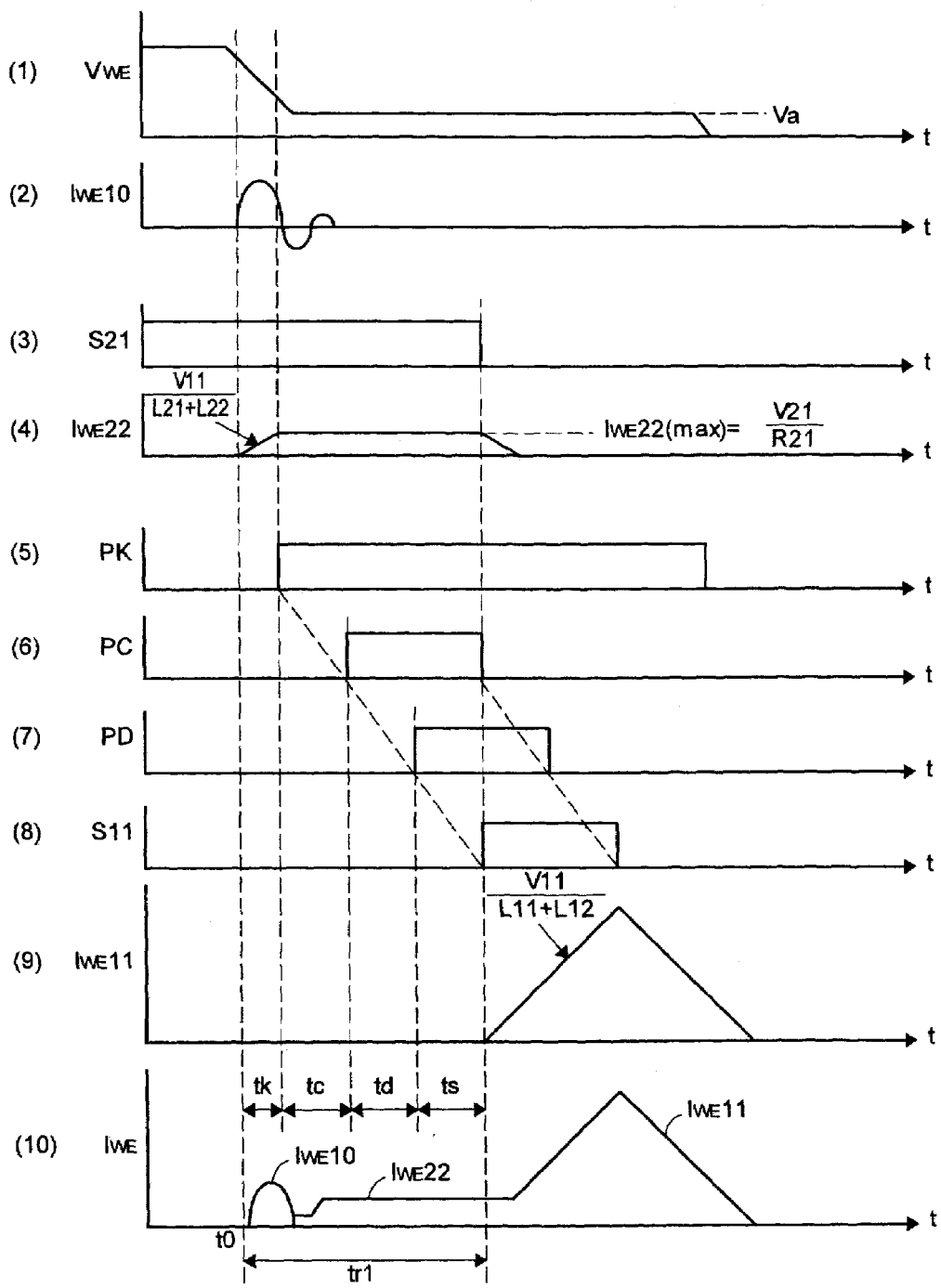
FIG. 4 is a diagram explaining a principle of operation of the conventional power supply device for electric discharge machining by the power supply control circuit shown in FIG. 3.

As shown in (9) in FIG. 8, although the inter-electrode current IWE changes to IWE=IWE0+IWE2+IWE1 as in the conventional example (see (10) in FIG. 4), an overlapping part of the currents increases significantly compared with the conventional example. Therefore, the inter-electrode current IWE can be adapted not to be cut off, and in addition, machining energy can be increased with the large overlapping part. Thus, machining efficiency is improved when the machining efficiency is compared at an identical discharge frequency.

Here, the switching elements S1a, S1b, S2a, and S2b will be explained by applying specific elements thereto. First, when it is assumed that the switching element IGBT shown in FIG. 1 is selected as an element with a large current capacity for the switching elements S1a and S1b to cause a large current to flow, the delay time ts1 is about 600 nanoseconds. Next, the switching elements S2a and S2b are decided as described below.

A pulse width of the discharge start current IWE0 caused by capacitor discharge is about 360 nanoseconds. When the switching element FET2 shown in FIG. 1 is used for the switching elements S2a and S2b, the delay time tr2 from the discharge start time t0 until the time when the discharge maintenance current IWE2 appears in the inter-electrode portion is about 410 nanoseconds as in the conventional example. This value is larger than the pulse width of the discharge start current IWE0. This causes cut-off in the inter-electrode current.

Thus, the switching element FET1 shown in FIG. 1 is selected as an element with a small current capacity for the switching elements S2a and S2b to cause only a current that can maintain discharge to flow. The delay time ts2 in this case is about 25 nanoseconds which is 60 nanometers shorter than that of the FET2. When the switching element FET1 is used, the delay time tr2 can be reduced to 350 nanoseconds. This time is shorter than the pulse width of 360 nanoseconds of the discharge start current IWE0.

Therefore, by using the switching element FET1 shown in FIG. 1 for the switching elements S2a and S2b, a period of a delay time after the output of the discharge start current IWE0 until the time when the electric discharge machining current IWE1 appears can be supplemented by the discharge maintenance current IWE2 generated by the switching elements S2a and S2b without any gap. Thus, the conductive path of the inter-electrode portion can be maintained without cutoff of the inter-electrode current IWE.

In addition, the discharge maintenance current IWE2 appears in the inter-electrode portion about ts1−ts2=575 nanoseconds earlier than the large electric discharge machining current IWE1. Thus, if the fixed time t2 (on), in which the switching elements S2a and Sb2 are in the ON operation state, is set such that the pulse width of the discharge maintenance current IWE2 is 575 nanoseconds or more, the discharge maintenance current IWE2 and the large electric discharge machining current IWE1 can be formed in an output current waveform that is continuous temporally.

Next, a significance of the present invention will be explained specifically with reference to FIG. 9. Note that a horizontal axis in FIG. 9 indicates machining speed [mm$^2$/min], and a vertical axis indicates a heat value. In FIG. 9, a characteristic 36 indicates a characteristic chart at the time when the switching elements S1a, S1b, S2a, and S2b include switching elements with a single characteristic as in the conventional example, and the switching element 4 (IGBT) shown in FIG. 1 is used as an element with a large capacity. A characteristic 37 indicates a characteristic chart at the time when the switching elements S1a, S1b, S2a, and S2b include switching elements with a single characteristic as in the conventional example, and the switching element 1 (FET1) shown in FIG. 1 is used as an element of a small capacity. A characteristic 38 indicates a characteristic chart at the time when the switching elements S1a, S1b, S2a, and S2b include switching elements with different characteristics according to the present invention, and the switching element 1 (FET1) and the switching element 4 (IGBT) shown in FIG. 1 are used in combination. A characteristic 39 indicates a characteristic chart at the time when the switching elements S1a, S1b, S2a, and S2b include switching elements with a signal characteristic as in the conventional example, and the switching element 1 (FET2) shown in FIG. 1 is used as an element with a small capacity.

Even when the switching elements S1a, S1b, S2a, and S2b include a single switching element, only a relatively small number of elements are required when the switching element 4 (IGBT) shown in FIG. 1 is used as an element with a large capacity. However, in a circuit having only a large capacity switching element, since an characteristic operation of the element is not fast sufficiently, the electric discharge machining current IWE1 cannot be applied as early as possible while the discharge start current IWE0 flows and the inter-electrode current continues. At the time of output of the electric discharge machining current IWE1, an inter-electrode state is in insulation recovery (opened state without a conductive path). In such an inter-electrode state, as in the conventional example, a high voltage at the DC power supply V1 is applied to the inter-electrode portion, new discharge is caused by this high voltage, and a large current is caused to flow to the inter-electrode portion suddenly without preliminary discharge. The discharge is unstable, and as indicated by the characteristic 36, only machining speed of up to about 200 [mm$^2$/min] is obtained, and the machining speed cannot be improved.

On the other hand, when the switching elements S1a, S1b, S2a, and S2b include the switching element 1 (FET1) shown in FIG. 1, since this switching element 1 (FET1) is an element of high-speed response, the electric discharge machining current IWE1 can be applied as early as possible while the discharge start current IWE0 flows and the inter-electrode current continues. Thus, the problem as described above never occurs. However, in the circuit only with the switching element 1 (FET1), since a current capacity of the element is small, it is necessary to arrange a relatively large number of elements in parallel to output the large electric discharge machining current IWE1 directly in that state. In addition, in a high-speed machining area requiring a large current, an ON resistance of a switching element is large, and a maximum current capacity is small. Thus, there is a problem in that a heat value increases as indicated by the characteristic 37, and cooling for the element is costly.

On the other hand, according to the present invention, the switching elements S1a, S1b, S2a, and S2b include switching elements of different characteristics. For example, the switching element 1 (FET1) and the switching element 4 (IBGT) shown in FIG. 1 are used in combination. As a result, the problems described above are solved, and an electric discharge machining power supply device of high-speed response and with a large current and a low loss as indicated by the characteristic 38 can be realized with a small number of switching elements.

Note that the characteristic 39 indicates a relation between machining speed and a heat value in a circuit configuration using the switching element 2 (FET2) of FIG. 1 explained in the conventional example. It is seen from comparison with the characteristic 38 obtained by the present invention that a heat value at machining speed of 300 mm$^2$/min can be reduced significantly to about $\frac{2}{3}$ in the present invention.

In this way, according to the first embodiment, a conductive path formed in the inter-electrode portion can be maintained stably without being extinguished during a period of a delay time from preliminary discharge in electric discharge machining until input of a machining current. Thus, decline in machining efficiency due to failure in input of a machining current can be prevented. Unnecessary breakage of an electrode line can also be controlled. Therefore, machining efficiency and a machining speed can be improved.

Since a machining current can be inputted smoothly from preliminary discharge, roughing on a machining surface can be controlled to improve machining accuracy and a machining quality. Moreover, since a large capacity element with a relatively low speed in switching response can also be used, the number of elements can be reduced. As a result, the power supply device itself can be reduced in size and can be provided inexpensively. In addition, both large-current and high-frequency switching operations, which cannot be realized in a single switching circuit, can be attained, high-speed machining using a thick wire electrode is made possible.

Figure 10:
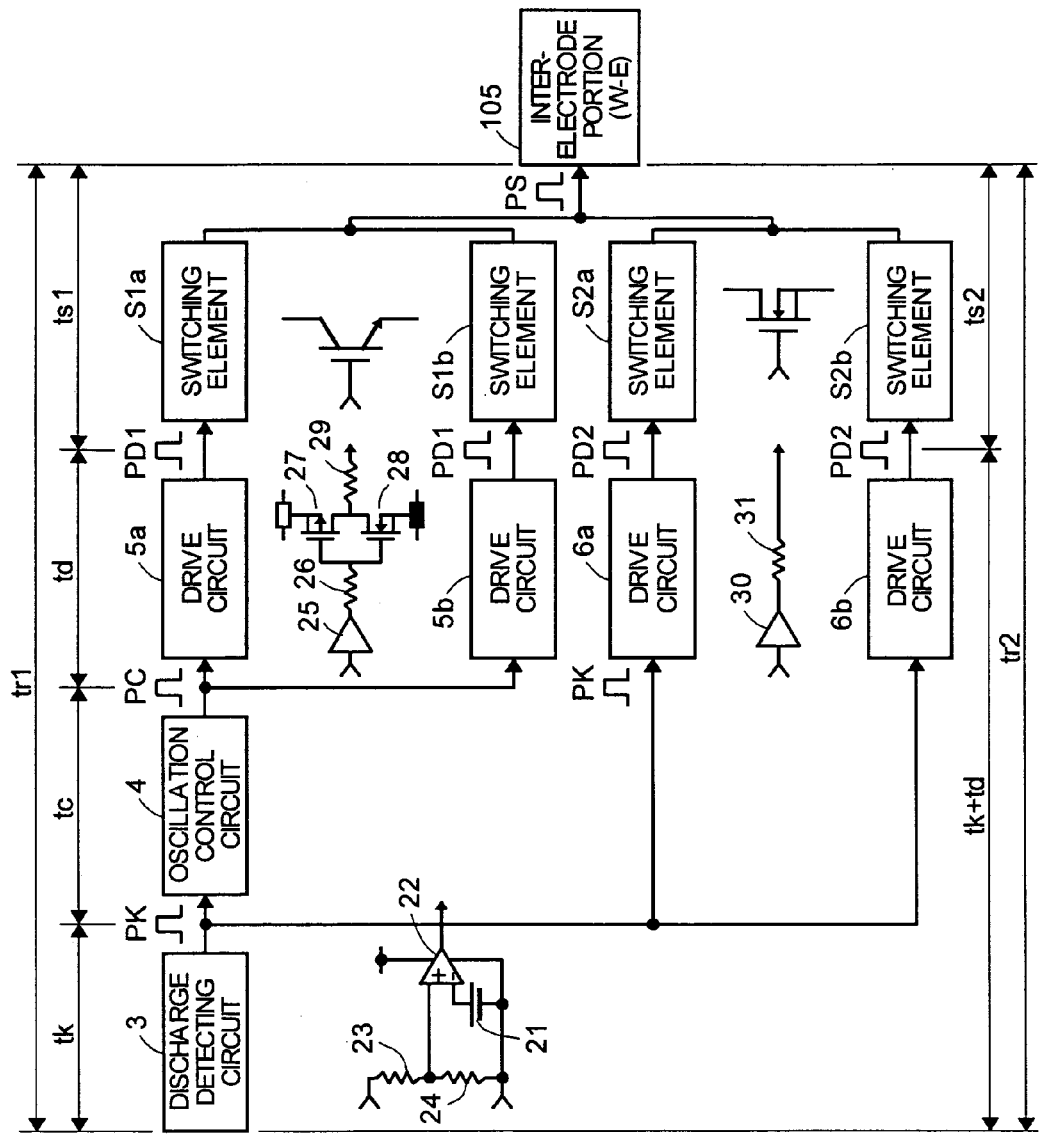
FIG. 10 is a block diagram of a structure of a power supply control circuit included in a power supply device for electric discharge machining that is a second embodiment of the present invention.

FIG. 10 is a block diagram of a structure of a power supply control circuit included in a power supply device for electric discharge machining that is a second embodiment of the present invention. Note that, in FIG. 10, components identical with or equivalent to the components described in the first embodiment (FIG. 6) are denoted by the identical reference numerals and signs. Here, parts related to the second embodiment will be mainly explained.

In short, the power supply control circuit according to the second embodiment is a circuit that controls to drive the switching elements S1a, S1b, S2a, and S2b in the power supply device for electric discharge machining described in the first embodiment (FIG. 1). In the second embodiment, as a relation of characteristics between the switching elements S1a and S1b and the switching elements S2a and S2b, a speed difference may be large as in the first embodiment. However, the second embodiment can be applied even when the speed difference is small.

As components, as shown in FIG. 10, the power supply control circuit has all the components described in the first embodiment (FIG. 6). The second embodiment is different from the first embodiment in that an input pulse signal of the drive circuits 6a and 6b is changed to the start instruction pulse signal PK outputted by the discharge detecting circuit 3. Note that, for convenience of explanation, a drive pulse signal, which is given from the drive circuits 6a and 6b to the switching elements S2a and S2b, is denoted by the same reference numeral PD2 as in the first embodiment (FIG. 6).

Figure 11:
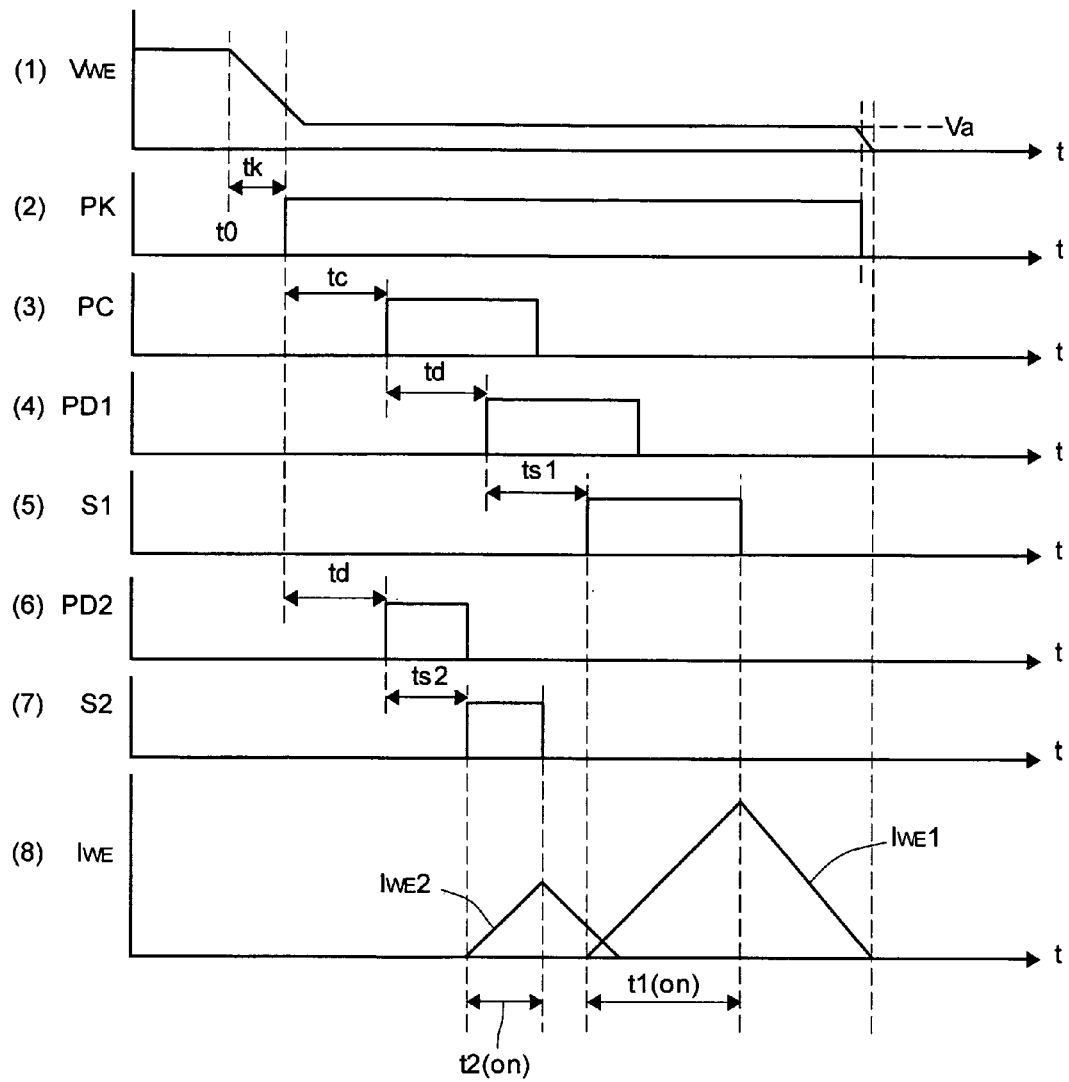
FIG. 11 is a diagram explaining a principle of operation of the power supply device for electric discharge machining by the power supply control circuit shown in FIG. 10.
Figure 12:
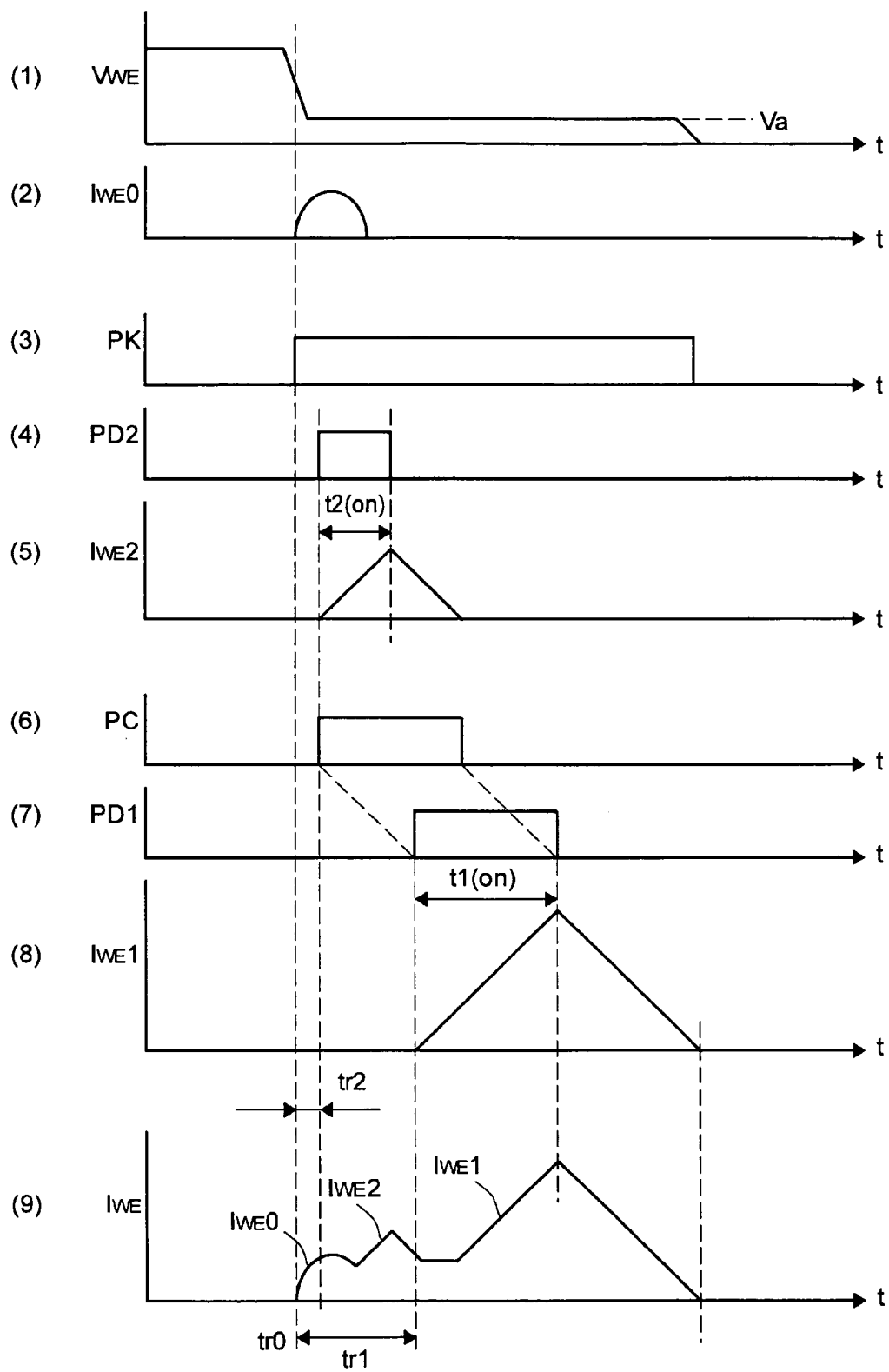
FIG. 12 is a diagram of operation waveforms of respective portions of the power supply device for electric discharge machining that is actuated by the power supply control circuit shown in FIG. 10.

Next, operations of the power supply device for electric discharge machining according to the second embodiment will be explained with reference to FIGS. 10 to 12. Note that FIG. 11 is a diagram explaining a principle of operation of the power supply device for electric discharge machining by the power supply control circuit shown in FIG. 10. FIG. 12 is a diagram showing operation waveforms of respective portions of the power supply device for electric discharge machining that is actuated by the power supply control circuit shown in FIG. 10.

In FIGS. 10 and 11, a certain inter-electrode voltage VWE is applied to the inter-electrode portion from another power supply device, which is not shown in the figures, to bring the inter-electrode portion into a state in which discharge can be performed. Consequently, capacitor discharge due to the stray capacitance C1 in the circuit occurs, and the discharge start current IWE0 appears in the inter-electrode portion. The inter-electrode voltage VWE drops rapidly and stabilizes at a lowest discharge voltage Va after the time tk has elapsed from the discharge start time t0 ((1) in FIG. 11).

When the discharge detecting circuit 3 detects the inter-electrode voltage VWE dropping to be lower than the reference voltage 21 with the comparator 21 and detects occurrence of discharge in the inter-electrode portion, the discharge detecting circuit 3 outputs the oscillation start instruction pulse signal PK to the oscillation control circuit 4 and the drive circuits 6a and 6b after the delay time tk from a point of the detection (discharge start time t0). The oscillation start instruction pulse PK is outputted until the inter-electrode voltage VWE disappears ((2) in FIG. 11).

The oscillation control circuit 4 receives the oscillation start instruction pulse signal PK and outputs the control pulse signal PC of a pulse width set in advance to the drive circuits 5a, 5b, 6a, and 6b after the delay time tc according to a machining state in the inter-electrode portion ((3) in FIG. 11).

Consequently, the drive circuits 5a and 5b output the drive pulse signal PD1 having a predetermined pulse width to the switching elements S1a and S1b to drive to turn ON the switching elements S1a and S1b after a delay time tk+tc+td ((4) in FIG. 11). The switching elements S1a and S1b come into an ON operation state for the fixed period t1 (on) after the delay time ts1 ((5) in FIG. 11). Since the current IWE1 flowing in the switching elements S1a and S1b appears in the inter-electrode portion through the floating inductances L1 and L2, the current IWE1 continues rising with a certain inclination in the fixed period t1 (on) and turns to drop simultaneously with end of the fixed period t1 (on) ((8) in FIG. 11).

On the other hand, the drive circuits 6a and 6b output the drive pulse signal PD2 having a predetermined pulse width to the switching elements S2a and S2b to drive to turn ON the switching elements S2a and S2b after a delay time tk+td ((6) in FIG. 11). The switching elements S2a and S2b come into an ON operation state for the fixed period t2 (on) after the delay time ts2 ((7) in FIG. 11). Since the current IWE2 flowing in the switching elements S2a and S2b appears in the inter-electrode portion through the floating inductances L1 and L2, the current IWE2 continues rising with a certain inclination in the fixed period t2 (on) and turns to drop simultaneously with end of the fixed period t2 (on) ((8) in FIG. 11).

Pulse widths of the drive pulse signals PD1 and PD2 are in a relation of PD1>PD2 as in the first embodiment ((4) and (6) in FIG. 11). Although the drive pulse signal PD1 has the same pulse width as the pulse width of the control pulse signal PC outputted by the oscillation control circuit 4, end time thereof can be changed and set from the outside. On the other hand, a fixed value may be used for the pulse width of the drive pulse signal PD2 because of a role of the drive pulse signal PD2.

In addition, the delay time ts1 of the switching elements S1a and S1b and the delay time ts2 of the switching elements S2a and S2b are in a relation of ts1>ts2 as in the first embodiment ((5) and (7) in FIG. 11).

In the second embodiment, since the switching elements S2a and S2b perform an ON operation at timing with the delay time tc in the oscillation control circuit 4 removed, the switching elements S2a and S2b come into the ON operation state earlier than the switching elements S1a and S1b by at least a time equivalent to the delay time tc. Therefore, the current IWE2 appears in the inter-electrode portion earlier than the current IWE1 by a time equivalent to the delay time tc.

As a result, as shown in (8) in FIG. 11, first, the current IME2 flowing in the switching elements S2a and S2b appears as the inter-electrode current IME after elapse of the time tr2 (tk+td+ts2=tr2). Thereafter, the current IME1 flowing in the switching elements S1a and S1b appears after elapse of the time tr1 (tk+tc+td+ts1=tr1). It is seen that the current IME2 corresponds to the discharge maintenance current IWE22 explained in the conventional example, and the current IME1 corresponds to the large electric discharge machining current IWE11 explained in the conventional example.

Then, by adjusting time positions and sizes of the period in which the switching elements S1a and Sb1 are in the ON operation state (t1 (on)) and the period in which the switching elements S2a and S2b are in the ON operation state (t2 (on)), as shown in (8) in FIG. 11, the discharge maintenance current IWE2 and the electric discharge machining current IWE1 are generated to have a large overlapping part.

In FIG. 12, operation waveforms in portions related to the inter-electrode current IWE explained above are extracted and shown. The same characteristics as those in the first embodiment (FIG. 8) are obtained. The second embodiment is different from the first embodiment in that, since the switching elements S2a and S2b come into the ON operation state earlier than the switching elements S1a and S1b by at least a time equivalent to the delay time tc, the delay time tr2 in which the discharge maintenance current IWE2 appears in the inter-electrode portion is shorter than that in the case of the first embodiment (FIG. 8).

Therefore, as in the first embodiment, the inter-electrode current IWE changes to IWE=IWE0+IWE2+IWE1, and an overlapping part of the currents increases significantly compared with the conventional example. The inter-electrode current IWE can be adapted not to be cut off, and in addition, machining energy can be increased with the large overlapping part. Thus, machining efficiency is improved when the machining efficiency is compared at an identical discharge frequency.

Figure 2:
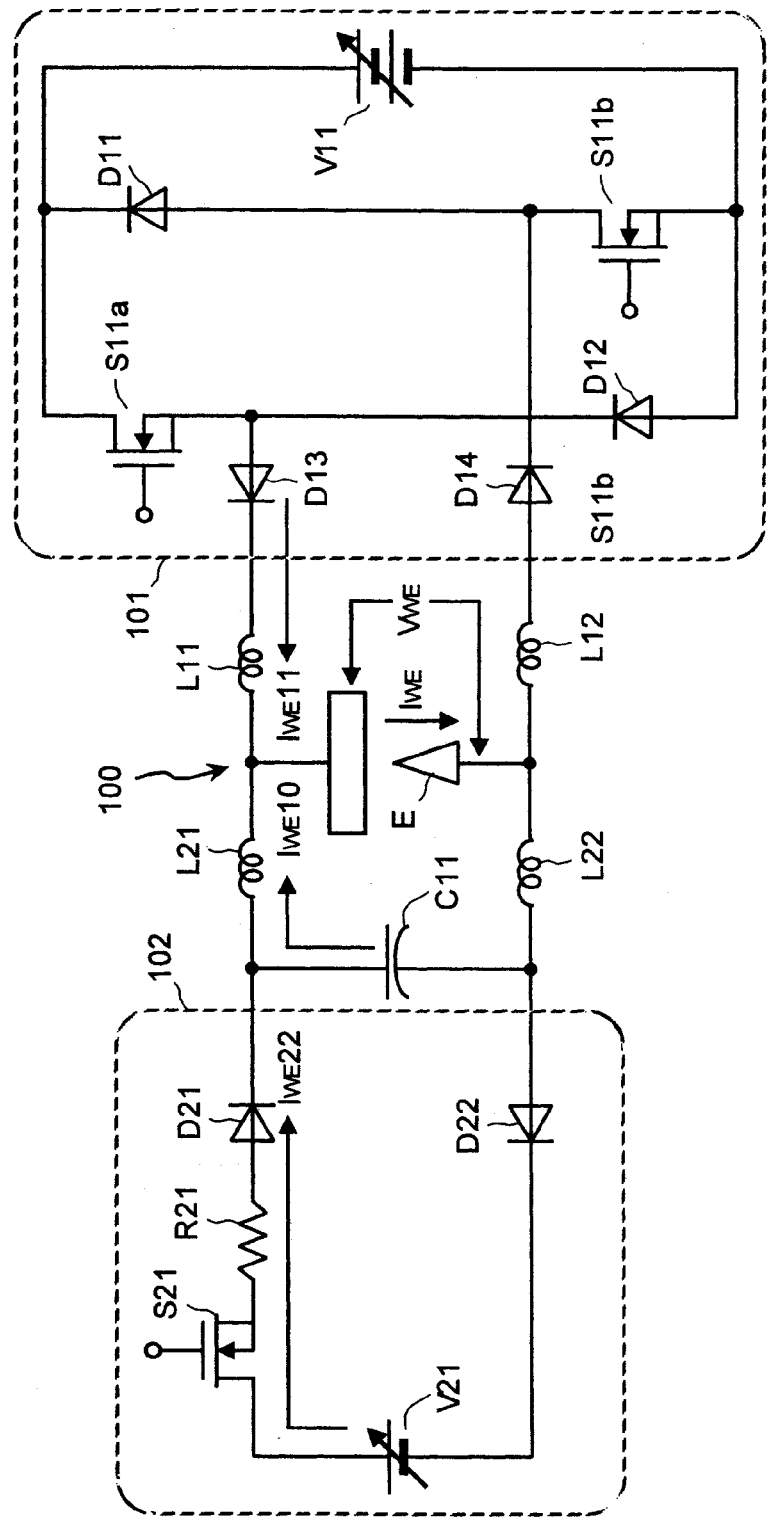
FIG. 2 is a circuit diagram of an example of a structure of a conventional power supply device for electric discharge machining.
Figure 3:
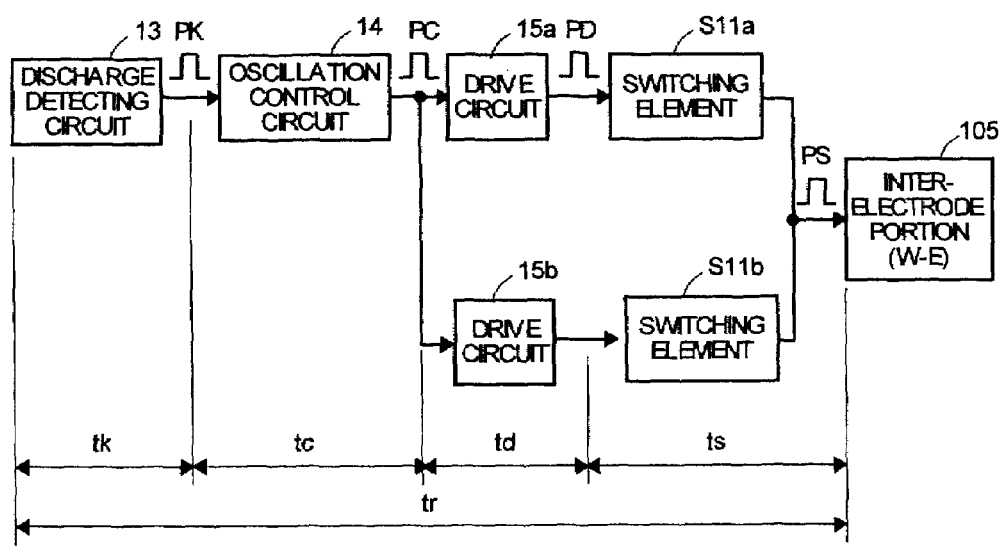
FIG. 3 is a block diagram showing a structure of a power supply control circuit that controls to drive switching elements in a power supply unit for machining discharge shown in FIG. 2.

Here, to facilitate understanding, the second embodiment will be explained using specific values. As in the conventional example, when the switching elements include elements of a single characteristic, the delay time tr1 from the discharge start time t0 until the time when the electric discharge machining current IWE1 appears in the inter-electrode portion is usually about 410 nanoseconds, and a pulse width of the discharge start current IWE0 due to capacitor discharge is about 360 nanoseconds. Therefore, in this case, there is a period of about 50 nanoseconds in which the inter-electrode current is cut off. In the conventional example, in this period, the discharge maintenance current (IWE22 in FIGS. 2 and 3) flows to prevent the inter-electrode current from being cut off.

On the other hand, in the second embodiment, although the delay time tc of the oscillation control circuit 4 is about 100 nanoseconds, since the delay time tr1 is reduced by this delay time tc, the delay time tr2 until the discharge maintenance current IWE2 appears in the inter-electrode portion is calculated as 410 ns−100 ns=310 ns. The delay time tr2 of 310 nanoseconds is shorter than the pulse width of 360 nanoseconds of capacitor discharge giving the discharge start current IWE0. Therefore, in a period of a delay time until the electric discharge machining current IWE1 appears after the generation of the discharge start current IWE0, since this discharge maintenance current IWE2 flows, the conductive path of the inter-electrode portion is maintained without the inter-electrode current being cut off. At this point, since tr1−tr2=410 ns−310 ns=100 ns, it is sufficient to set the fixed time t2 (on), at which the switching elements S2a and S2b are turned ON, such that a pulse width of the discharge maintenance current IWE2 is about 150 nanoseconds or more.

Incidentally, in the second embodiment, an element of the same electric characteristics as the switching elements S1a and S1b may be used for the switching elements S2a and S2b. However, it is more effective to use elements with different electric characteristics. For example, when the FET2 in FIG. 1 is used for the switching elements S1a and S1b and the FET1 in FIG. 1 is used for the switching elements S2a and S2b, the delay time ts1 of the switching elements S1a and S1b is 172 nanoseconds, and the delay time ts2 of the switching elements S2a and S2b is 75 nanoseconds.

In the circuit shown in FIG. 10, as described above, the switching elements S2a and S2b are turned ON earlier than the switching elements S1a and S1b by a time equivalent to the delay time tc. In this case, the switching elements S2a and S2b can be turned on still earlier by a time calculated as ts1−ts2=172 ns−75 ns=97 ns. Although the ON time t2 (on) of the switching elements S2a and S2b is a fixed time set in advance, the ON time t2 (on) is not required to be set as long as the ON time t1 (on) of the switching elements S1a and S1b in which the electric discharge machining current IWE1 is caused to flow.

More specifically, although the ON time t1 (on) of the switching elements S1a and S1b is about 1500 nanoseconds at the maximum, the ON time t2 (on) of the switching elements S2a and S2b only has to be about 150 nanoseconds. In addition, since a peak value of an output current is proportional to an ON time, a peak value of the discharge maintenance current IWE2 can be set markedly lower than a maximum peak value of the electric discharge machining current IWE1. Thus, a current capacity of the switching elements S2a and S2b may be smaller than a current capacity of the switching elements S1a and S1b.

Therefore, a switching element, which has a small current capacity but is faster in response like the FET1 in FIG. 1, can be used for the switching elements S2a and S2b. Conversely, an element with low-speed switching response can be used for the switching elements S1a and S1b. The response time only has to be in a range in which the conductive path of the inter-electrode portion can be maintained by the switching elements S2a and S2b during the period of the delay time of discharge start current IWE0 and the electric discharge machining current IWE1.

In addition, as shown in FIG. 1, in general, a gate input capacity tends to be small in a switching element having a smaller current capacity even if a rated voltage is the same. In other words, smaller electric power is required for driving. Therefore, driving of the switching elements S2a and S2b may be performed directly according to the output signal (start instruction pulse signal) PK of the discharge detecting circuit 3. In this case, since the drive circuits 6a and 6b are removed, the response time can be reduced by a time equivalent to the delay time td in the drive circuits 6a and 6b.

Moreover, if only the switching elements S2a and S2b are used while the switching elements S1a and S1b are kept OFF, electric discharge machining can be performed with a current waveform with a pulse width shorter than that in the past. When compared at a minimum pulse width shown in FIG. 1, whereas the minimum pulse width is 472 nanoseconds in the FET2, the minimum pulse width can be reduced to 210 nanoseconds when only the FET1 is used.

As described above, according to the second embodiment, the same actions and effects as those in the first embodiment can be obtained, and in addition, a range of selection of usable switching elements can be widened.

Third Embodiment

Figure 13:
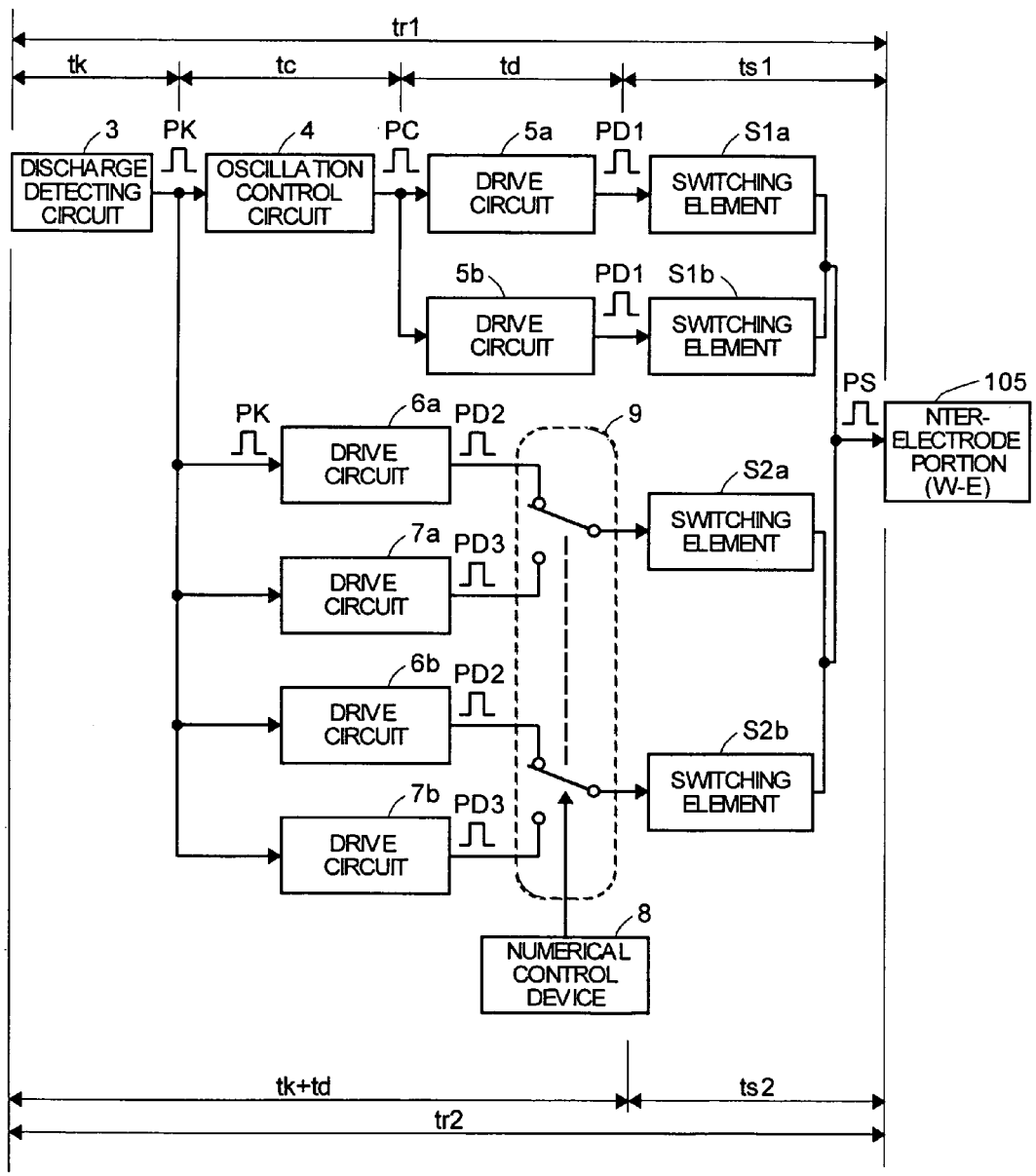
FIG. 13 is a block diagram of a structure of a power supply control circuit included in a power supply device for electric discharge machining that is a third embodiment of the present invention.

FIG. 13 is a block diagram of a structure of a power supply control circuit included in a power supply device for electric discharge machining that is a third embodiment of the present invention. Note that, in FIG. 13, components identical with or equivalent to the components described in the second embodiment (FIG. 10) are denoted by the identical reference numerals and signs. Here, parts related to the third embodiment will be mainly explained.

In short, the power supply control circuit according to the third embodiment is a circuit that controls to drive the switching elements S1a, S1b, S2a, and S2b in the power supply device for electric discharge machining described in the first embodiment (FIG. 1). As shown in FIG. 13, drive circuits 7a and 7b, a numerical control device 8, and a switching device 9 are added as components in addition to the components described in the second embodiment (FIG. 10).

An input signal of the drive circuits 7a and 7b is the start instruction pulse signal PK outputted by the discharge detecting circuit 3 as in the drive circuits 6a and 6b. An output of the drive circuit 6a (the drive pulse signal PD2) and an output of the drive circuit 7a (a drive pulse signal PD3) are inputted to the switching device 9 as a set. In addition, an output of the drive circuit 6b (the drive pulse signal PD2) and an output of the drive circuit 7ab (the drive pulse signal PD3) are inputted to the switching device 9 as a set.

According to an instruction from the external numerical control device 8, the switching device 9 operates to select one of the output of the drive circuit 6a (the drive pulse signal PD2) and the output of the drive circuit 7a (the drive pulse signal PD3) and give the selected output to the switching element S2a and select one of the output of the drive circuit 6b (the drive pulse signal PD2) and the output of the drive circuit 7ab (the drive pulse signal PD3) and give the selected output to the switching element S2b.

Here, although times, in which the switching element S2a is driven to be turned ON, generated by the drive circuits 6a and 7a are fixed times set in advance, the fixed times are set differently in the drive circuit 6a and the drive circuit 7a. Therefore, the drive circuit 6a and the drive circuit 7a are switched by the switching device 9 for the ON driving for the switching element S2a, whereby the ON time for the switching element S2a can be changed.

Similarly, times, in which the switching element S2b is driven to turn ON, generated by the drive circuits 6b and 7b are also different from each other. An ON time for the switching element S2b can be changed by the switching device 9. Moreover, since the switching element 9 is adapted to operate according to an instruction from the external numerical control device 8, ON times for the switching elements S2a and S2b can be variably controlled by the numerical control device 8.

In addition, in FIG. 13, two drive circuits are provided for one switching element. However, three or more drive circuits with different settings for ON times can be provided such that ON times for switching elements can be variable finely.

As described above, according to the third embodiment, the same actions and effects as those in the second embodiment can be obtained, and in addition, a driving time for a switching element for high-speed operation can be subjected to variable control arbitrarily.

Figure 14:
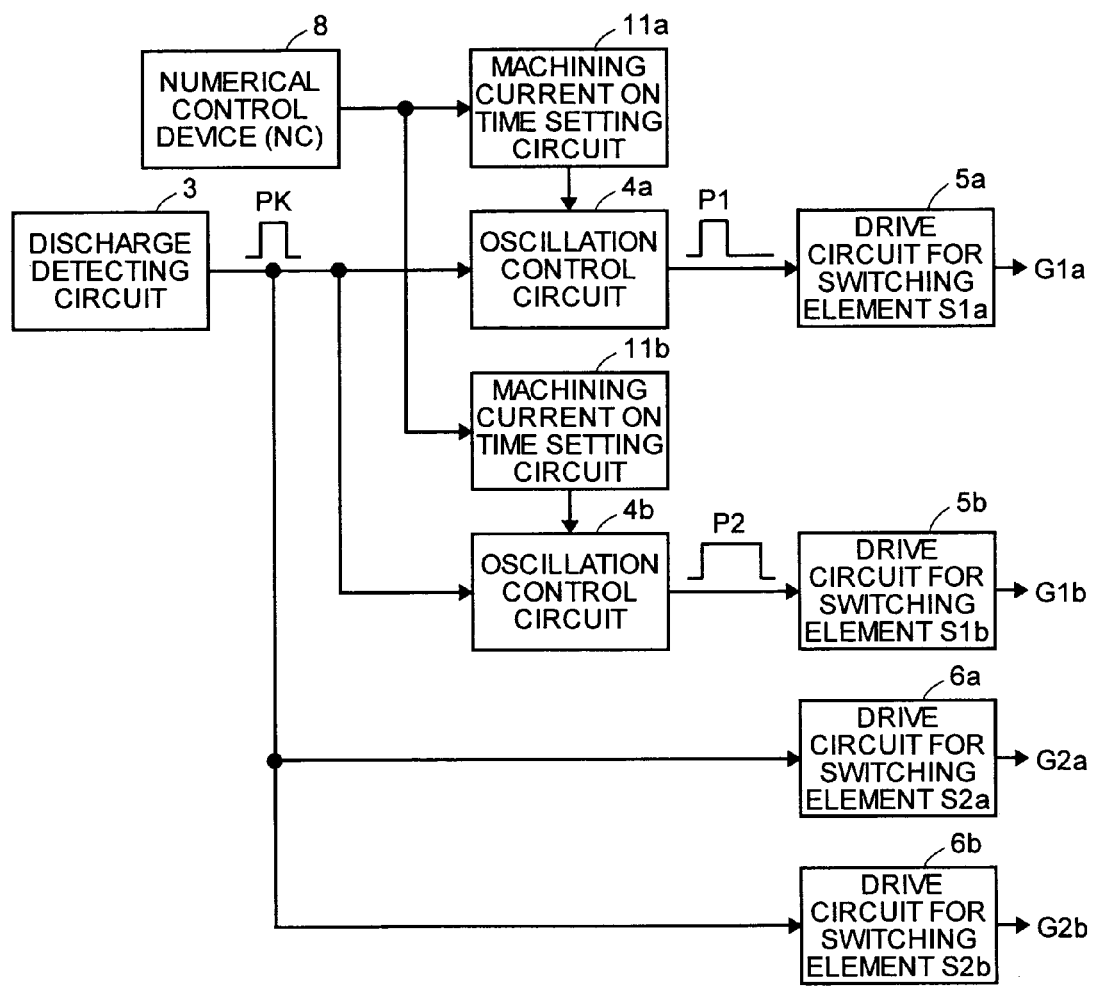
FIG. 14 is a block diagram of a power supply control circuit included in a power supply device for electric discharge machining that is a fourth embodiment of the present invention.

FIG. 14 is a block diagram of a structure of a power supply control circuit included in a power supply device for electric discharge machining that is a fourth embodiment of the present invention. Note that, in FIG. 14, components identical with or equivalent to the components described in the second embodiment (FIG. 10) are denoted by the identical reference numerals and signs. Here, parts related to the fourth embodiment will be mainly explained.

In short, the power supply control circuit according to the fourth embodiment is a circuit that controls to drive the switching elements S1a, S1b, S2a, and S2b in the power supply device for electric discharge machining described in the first embodiment (FIG. 1). The fourth embodiment describes an example (first example) of a structure of a circulating current drive system that ON/OFF controls the switching elements S1a and S1b with a low loss in different ON operation times to form various current circulating loops.

As components, as shown in FIG. 14, oscillation control circuits 4a and 4b are provided instead of the oscillation control circuit 4 in the structure described in the second embodiment (FIG. 10), and the numerical control device (NC) 8 and machining current ON time setting circuits 11a and 11b are added accordingly.

An output of the discharge detecting circuit 3 (the start instruction pulse signal PK) is inputted to the oscillation control circuits 4a and 4b, the drive circuit 6a of the switching element S2a (i.e., the drive circuit 6a shown in FIG. 10), and the drive circuit 6b of the switching element S2b (i.e., the drive circuit 6b shown in FIG. 10).

When the start instruction pulse signal PK is inputted from the discharge detecting circuit 3, the drive circuit 6a of the switching element S2a (hereinafter simply referred to as "drive circuit 6a") outputs a gate drive signal G2a to the switching element S2a in response to the start instruction pulse signal PK. When the start instruction pulse signal PK is inputted from the discharge detecting circuit 3, the drive circuit 6b of the switching element S2b (hereinafter simply referred to as "drive circuit 6b") outputs a gate drive signal G2b to the switching element S2b in response to the start instruction pulse signal PK.

The machining current ON time setting circuit 11a sets a machining current ON time according to an instruction of the numerical control device (NC) 8 and gives the set value to the oscillation control circuit 4a. When the start instruction pulse signal PK is inputted from the discharge detecting circuit 3, the oscillation control circuit 4a generates a control pulse signal P1, which has the machining current ON time designated by the machining current ON time setting circuit 11a as a pulse width, in response to the start instruction pulse signal PK and gives the control pulse signal P1 to the drive circuit 5a of the switching element S1a (i.e., the drive circuit 5a shown in FIG. 10). The drive circuit 5a of the switching element S1a (hereinafter simply referred to as "drive circuit 5a") outputs a gate drive signal G1a to the switching element S1a.

The machining current ON time setting circuit 11b sets a machining current ON time of a value different from the machining current ON time set by the machining current ON time setting circuit 11a according to an instruction of the numerical control device (NC) 8 and gives the set value to the oscillation control circuit 4b. When the start instruction pulse signal PK is inputted from the discharge detecting circuit 3, the oscillation control circuit 4b generates a control pulse signal P2, which has the machining current ON time designated by the machining current ON time setting circuit 11b as a pulse width, in response to the start instruction pulse signal PK and gives the control pulse signal P2 to the drive circuit 5b of the switching element S1b (i.e., the drive circuit 5b shown in FIG. 10). The drive circuit 5b of the switching element S1b (hereinafter simply referred to as "drive circuit 5b") outputs a gate drive signal G1b to the switching element S1b.

Here, pulse widths of the control pulse signals P1 and P2 are in a relation of P1<P2, but a case of P1<P2 and a case of P1>P2 interchanges during an operation.

Figure 15:
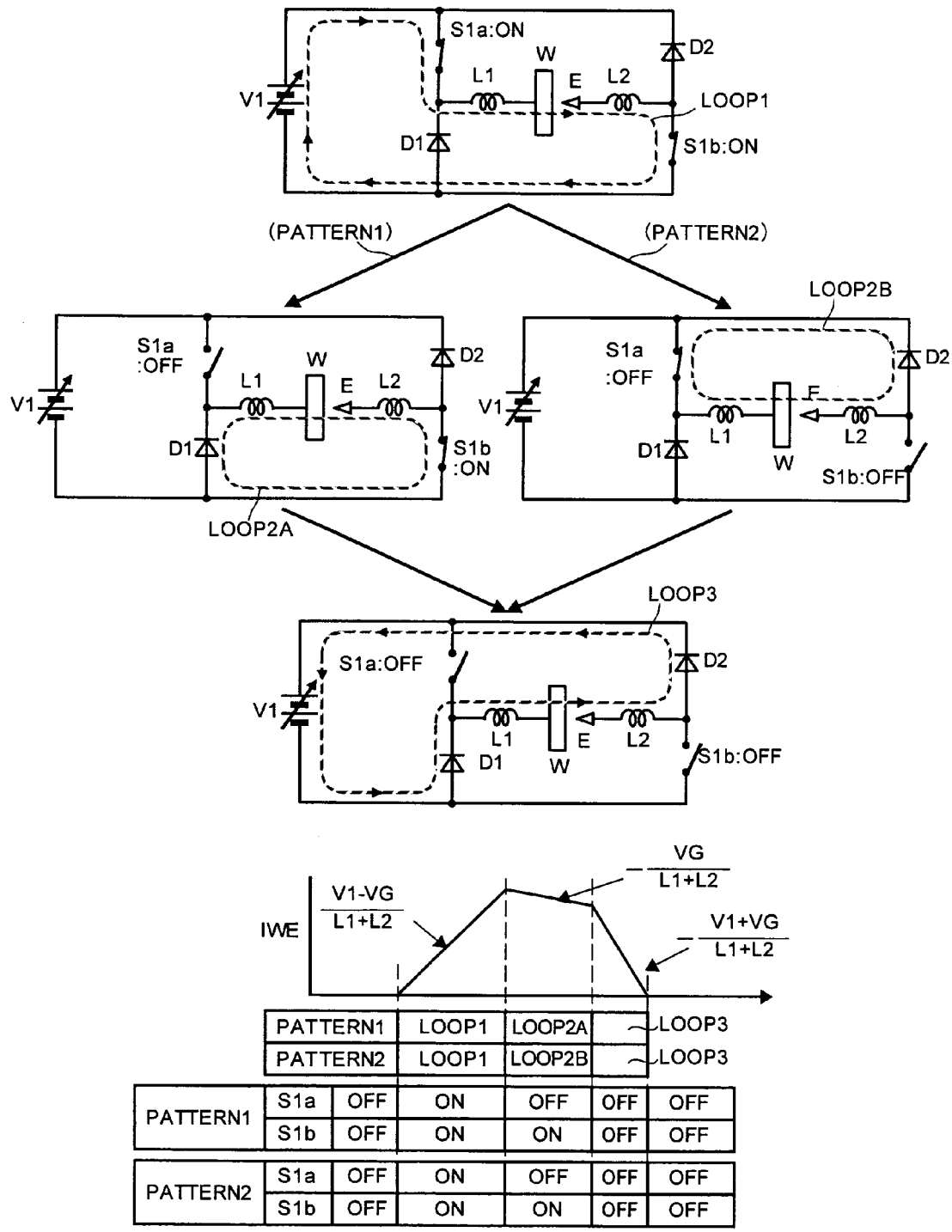
FIG. 15 is a diagram explaining a principle of operation of the power supply device for electric discharge machining by the power supply control circuit shown in FIG. 14.
Figure 16:
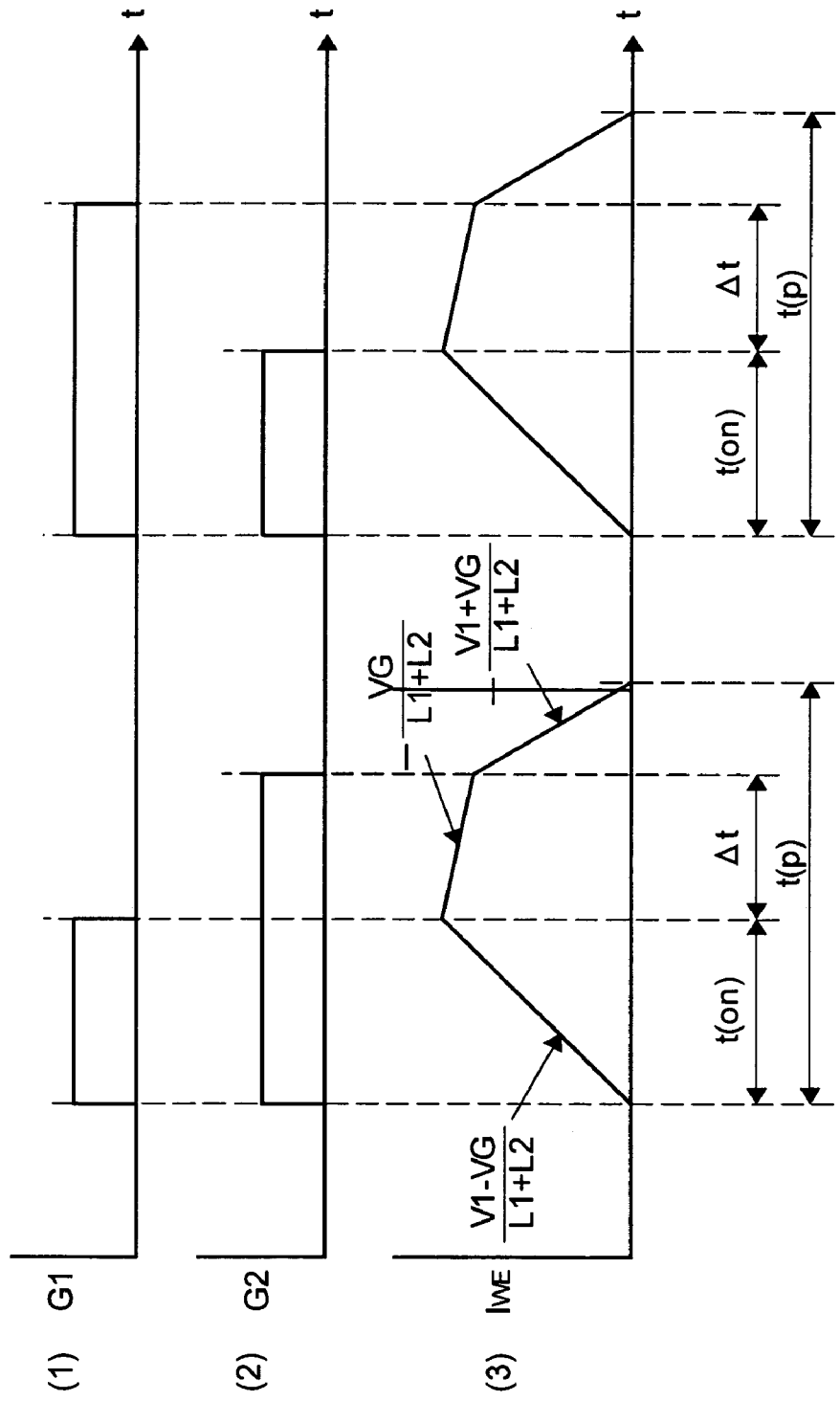
FIG. 16 is a diagram explaining a relation between gate drive signals outputted by the power supply control circuit shown in FIG. 14 and an inter-electrode current in the power supply device for electric discharge machining.

Next, operations of the power supply device for electric discharge machining according to the fourth embodiment will be explained with reference to FIGS. 14 to 16. Note that FIG. 15 is a diagram explaining a principle of operation of the power supply device for electric discharge machining by the power supply control circuit shown in FIG. 14. FIG. 16 is a diagram explaining a relation between a gate drive signal outputted by the power control circuit shown in FIG. 14 and an inter-electrode current in the power supply device for electric discharge machining.

In FIGS. 14 and 15, when the inter-electrode portion comes into a state in which discharge can be performed, the control pulse signal P1, which has the machining current ON time set by the machining current ON time setting circuit 11a as a pulse width, is outputted from the oscillation control circuit 4a to the drive circuit 5a. The drive circuit 5a drives to turn on the switching element S1a by a degree equivalent to the pulse width of the inputted control pulse signal P1. On the other hand, at the same time, the control pulse signal P2, which has the machining current ON time set by the machining current ON time setting circuit 11b as a pulse width, is outputted from the oscillation control circuit 4b to the drive circuit 5b.

In this case, the pulse width of the control pulse signal P2 is set longer than the control pulse signal P1 by a very short time $\Delta t$. In other words, P2=P1+$\Delta t$. Since the drive circuit 5b drives to turn on the switching element S1b by a degree equivalent to the pulse width of the inputted control pulse signal P2, the switching element S1b is in the ON operation state longer than the switching element S1a by the very short time $\Delta t$. However, since rising timing of the control pulse signals P1 and P2 is simultaneous, the switching elements S1a and S1b driven by outputs of the drive circuits 5a and 5b perform ON operations simultaneously.

The switching elements S1a and S1b perform ON operations simultaneously, whereby the electric discharge machining current IWE flows to the inter-electrode portion through a path of a loop 1 shown in FIG. 15. At this point, the electric discharge machining current IWE is proportional to elapse of time, and when VG is assumed as a gate potential of a switching element, rises with an inclination of (V1−VG)/(L1+L2). In that process, the control pulse signal P2 maintains a high level, and only the control pulse signal P1 changes to a low level. Since the control pulse signal P1 changes to the low level, the drive circuit 5a brings the switching element S1a into an OFF state. On the other hand, since the pulse signal P2 maintains the high level, the drive circuit 5b maintains the ON operation state of the switching element S1b.

Since the switching element S1a is turned OFF, supply from the DC power supply V1 is cut off and the electric discharge machining current IWE, which has been continuing to rise, turns to drop. However, according to an inductive action of the floating inductances L1 and L2 in the circuit, the electric discharge machining current IWE is about to continue to flow with an inclination of −VG/(L1+L2) through a path of a loop 2A shown in FIG. 15. In this process, since the control pulse signal P2 changes to a low level, the drive circuit 5b brings the switching element S1b into an OFF state.

Here, if the control pulse signal P2 is at the low level before inductive energy of the floating inductances L1 and L2 in the circuit disappears, the remaining electric discharge machining current IWE, which is dropping with the inclination of −VG/(L1+L2), flows through a path of a loop 3 shown in FIG. 15, steeply returns to the DC power supply V1 with an inclination of −(V1+VG)/(L1+L2), and is regenerated. As a result, the electric discharge machining current IWE has a trapezoidal wave as shown in FIG. 15. The above is an operation at P2=P1+$\Delta t$ (an operation of a pattern 1).

In such a trapezoidal waveform, a steady loss in the switching element S1b increases by an amount equivalent to the extension of the pulse width by the very short time $\Delta t$. However, since the switching elements S2a and S2b perform a high-speed operation as in the second embodiment, an element such as an IGBT can be used for the switching elements S1a and S1b. Therefore, a loss can be minimized. In general, the IGBT does not have an ON resistance that is structurally present in a MOS-FET or the like, a loss in a steady state (ON state) is small, and an increase in loss due to the extension of the pulse width can be controlled effectively. In addition, since the switching elements S2a and S2b are already in the OFF state during the extended period of the very short time $\Delta t$, an increase in loss due to the extension of the very short time $\Delta t$ does not occur even if a high-speed response MOS-FET is used.

In addition, although a relation between the control pulse signals P1 and P2 is P2=P1+$\Delta t$ in the above explanation of the operation, the control pulse signals P1 and P2 may be interchanged during an operation to perform oscillation control alternately such that the relation is changed to P1=P2+$\Delta t$. In this case, ON/OFF operations of the switching elements S2a and S2b during the period of the very short time $\Delta t$ in the above explanation of the operation are reversed, and a path indicated by a loop 2A shown in FIG. 15 only changes to a path of a loop 2B. The trapezoidal wave shown in FIG. 15 is obtained in the same manner. The above is an operation at P1=P2+Δt (an operation of a pattern 2).

In FIG. 16, (1) indicates a gate drive signal G1. (2) indicates a gate drive signal G2. (3) indicates the inter-electrode current IWE. In the figure, a relation between the gate drive signals G1 and G2 on the left side is P2=P1+Δt (pattern 1). A relation between the gate drive signals G1 and G2 on the right side is P1=P2+Δt (pattern 2). The inter-electrode signal IWE is a trapezoidal wave of a similar waveform in both the cases.

When a path of a circulating current loop is fixed with such a trapezoidal waveform, in the switching elements S1a and S1b, since a difference occurs in a ratio of a switching loss and a steady loss, a balance of loss is broken. However, since the oscillation control circuit and the machining current ON time setting circuit are provided individually in each of the switching elements S1a and S1b, circulating current loops can be switched alternately, and a loss due to a load current of the switching elements can be distributed in good balance without being concentrated.

According to the fourth embodiment, since the circulating current drive system is adopted, input energy per one pulse of intermittent discharge can be increased, and electric discharge machining using a thick wire electrode requiring a large current becomes possible.

Figure 17:
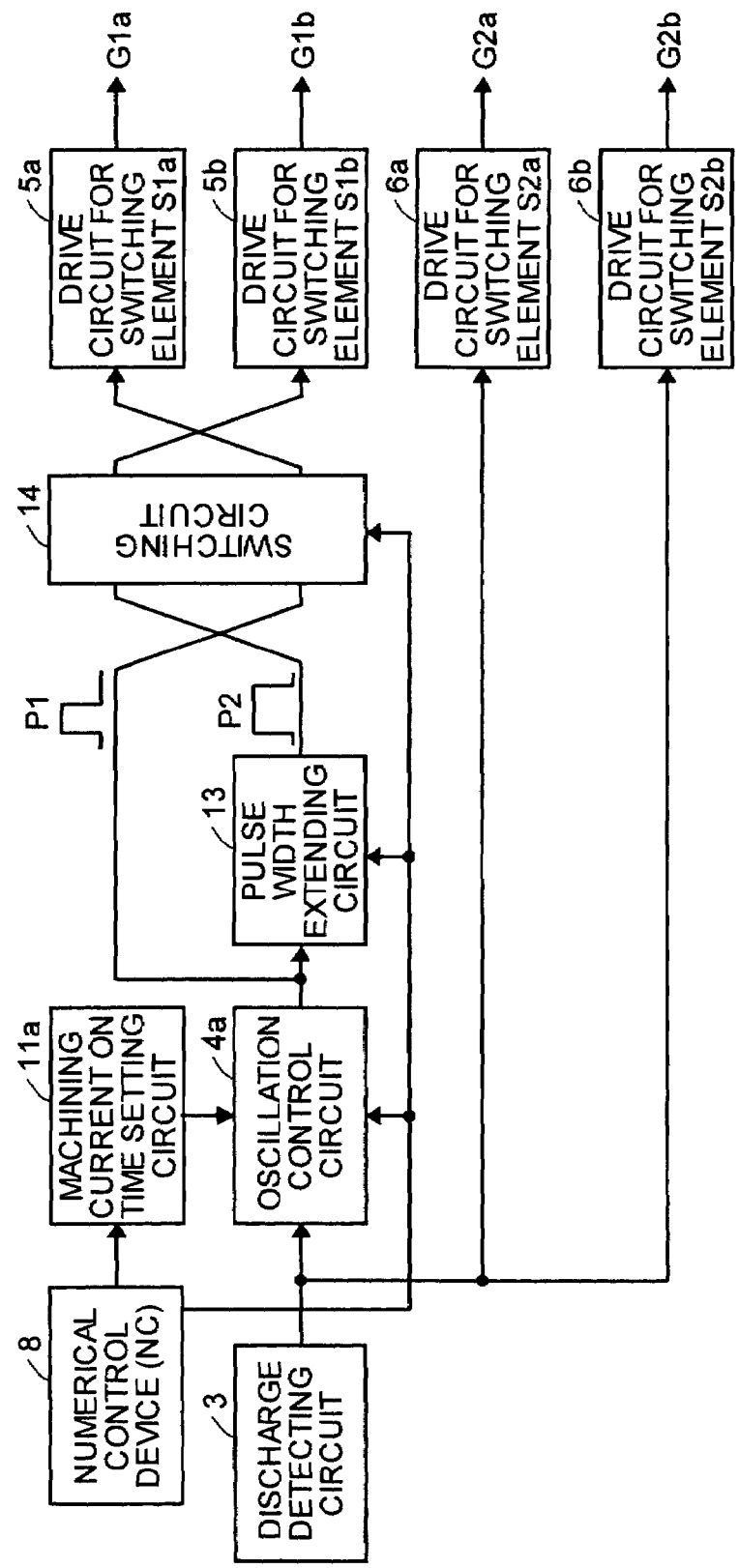
FIG. 17 is a block diagram of a structure of a power supply control circuit included in a power supply device for electric discharge machining that is a fifth embodiment of the present invention.

FIG. 17 is a block diagram of a structure of a power supply control circuit included in a power supply device for electric discharge machining that is a fifth embodiment of the present invention. Note that, in FIG. 17, components identical with or equivalent to the components described in the fourth embodiment (FIG. 14) are denoted by the identical reference numerals and signs. Here, parts related to the fifth embodiment will be mainly explained.

In short, the power supply control circuit according to the fifth embodiment is a circuit that controls to drive the switching elements S1a, S1b, S2a, and S2b in the power supply device for electric discharge machining described in the first embodiment (FIG. 1). The fifth embodiment describes an example (second example) of a structure of a circulating current drive system that ON/OFF controls the switching elements S1a and S1b with a low loss in different ON operation times to form various current circulating loops.

As components, as shown in FIG. 17, the oscillation control circuit 4b and the machining current ON time setting circuit 11b are not provided in the structure described in the fourth embodiment (FIG. 14), and a pulse width extending circuit 13 and a switching circuit 14 are provided instead.

An output of the numerical control device (NC) 8 is given to the oscillation control circuit 4a and the machining current ON time setting circuit 11a and, in addition, given to the pulse width extending circuit 13 and the switching circuit 14. An output of the oscillation control circuit 4a (the control pulse signal P1) is given to the pulse width extending circuit 13 and the switching circuit 14. The pulse width extending circuit 13 generates the control pulse signal P2, which is obtained by extending a pulse with of the inputted control pulse signal P1 according to an instruction from the numerical control device (NC) 8, and outputs the control pulse signal P2 to the switching circuit 14. The switching circuit 14 is adapted to switch output destinations (the switching elements S1a and S1b) of the inputted control pulse signals P1 and P2 according to an instruction from the numerical control device (NC) 8.

In other words, although pulse widths of the generated control pulse signals P1 and P2 are in a relation of P1<P2, substantially the same operation as the fourth embodiment can be performed by an action of the switching device 14.

Next, operations of the power supply device for electric discharge machining will be explained with reference to FIG. 17. In FIG. 17, when the inter-electrode portion comes into a state in which discharge can be started, the control pulse signal P1, which has a machining current ON time set by the machining current ON time setting circuit 11a as a pulse width, is outputted from the oscillation control circuit 4a to the pulse width extending circuit 13 and the switching circuit 14.

The extending circuit 13 outputs the control pulse signal P2, which is obtained by extending a pulse width of the control pulse signal P1 outputted from the oscillation control circuit 4a according to an instruction value from the numerical control device 8, to the switching circuit 14. The switching circuit 14 switches output destinations of the respective inputted control pulse signals P1 and P2 to one of the drive circuits 5a and 5b and outputs the control pulse signals P1 and P2. For example, it is assumed that the switching circuit 14 outputs the control pulse signal P1 to the drive circuit 5a and outputs the control pulse signal P2 to the drive circuit 5b.

The drive circuit 5a drives to turn ON the switching element S1a by a degree equivalent to the pulse width of the inputted control pulse signal P1. On the other hand, at the same time, the drive circuit 5b drives to turn ON the switching element S1b by a degree equivalent to the pulse width of the inputted control pulse signal P2. At this point, when it is assumed that an extension time of the control pulse signal P1 extended by the extending circuit 13 is Δt, a relation between the control pulse signal P1 and the control pulse signal P2 is P2=P1+Δt as explained in the fourth embodiment.

In this case, the switching element S1b is in an ON operation state longer than the switching element S1a by the extension time Δt. However, by reversing the relation between the control pulse signals P1 and P2, which are outputted by the drive circuits 5a and 5b, with the switching circuit 14, it is also possible to keep the switching element S1a in the ON operation state longer than the switching element S1b by the extension time Δt. Note that, as explained in the fourth embodiment, it is needless to mention that this extension time Δt can be variably controlled arbitrarily according to an instruction of the numerical control device 8.

As described above, according to the fifth embodiment, since the pulse width extending circuit 13 is provided, the machining current ON time setting circuit 11b and the oscillation control circuit 4b described in the fourth embodiment (FIG. 14) can be removed, and the same actions and effects as those in the fourth embodiment can be obtained with a simple structure.

Figure 18:
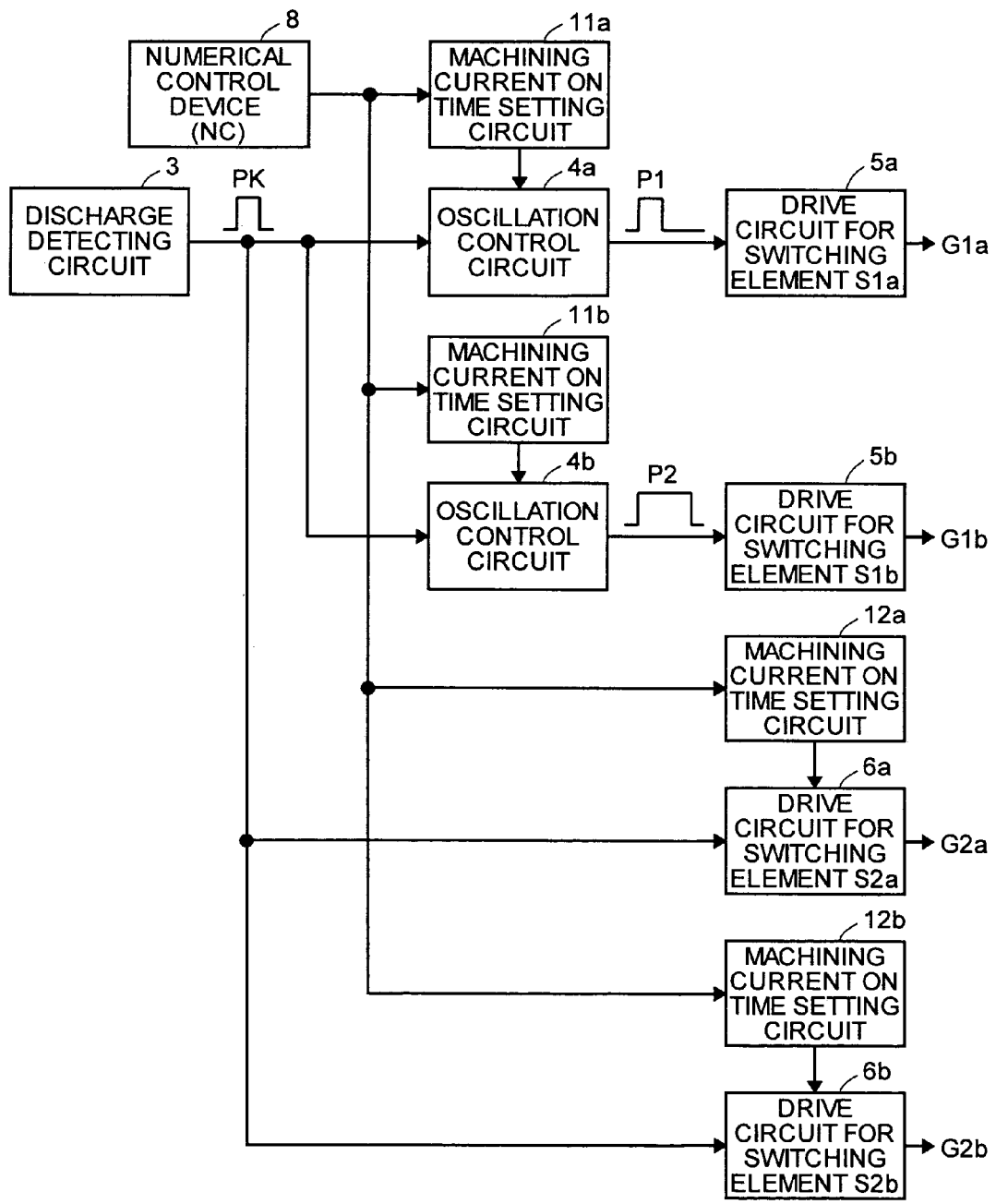
FIG. 18 is a block diagram of a structure of a power supply control circuit included in a power supply device for electric discharge machining that is a sixth embodiment of the present invention.

FIG. 18 is a block diagram of a structure of a power supply control circuit included in a power supply device for electric discharge machining that is a sixth embodiment of the present invention. Note that, in FIG. 18, components identical with or equivalent to the components described in the fourth embodiment (FIG. 14) are denoted by the identical reference numerals and signs. Here, parts related to the sixth embodiment will be mainly explained.

In short, the power supply control circuit according to the sixth embodiment is a circuit that controls to drive the switching elements S1a, S1b, S2a, and S2b in the power supply device for electric discharge machining described in the first embodiment (FIG. 1). The sixth embodiment describes an example (third example) of a structure of a circulating current drive system that ON/OFF controls the switching elements S1a and S1b with a low loss in different ON operation times to form various current circulating loops.

As components, as shown in FIG. 18, machining current ON time setting circuits 12a and 12b are added in the structure described in the fourth embodiment (FIG. 14). An output of the numerical control device (NC) 8 is given to the oscillation control circuits 4a and 4b and the machining current ON time setting circuits 11a and 11b and, in addition, given to the machining current ON time setting circuits 12a and 12b.

The machining current ON time setting circuit 12a sets a machining current ON time according to an instruction of the numerical control device (NC) 8 and outputs the set value to the drive circuit 6a. When the start instruction pulse signal PK is inputted from the discharge detecting circuit 3, the drive circuit 6a generates a gate drive signal G2a, which has a machining current ON time designated by the machining current ON time setting circuit 12a as a pulse width, in response to the start instruction pulse signal PK and drives to turn ON the switching element S2a.

The machining current ON time setting circuit 12b sets a machining current ON time of a value different from a machining current ON time for the machining current ON time setting circuit 12a according to an instruction of the numerical control device (NC) 8 and outputs the set value to the drive circuit 6b. When the start instruction pulse signal PK is inputted from the discharge detecting circuit 3, the drive circuit 6b generates a gate drive signal G2b, which has a machining current ON time designated by the machining current ON time setting circuit 12b as a pulse width, in response to the start instruction pulse signal PK and drives to turn ON the switching element S2b.

According to this structure, since the machining current ON time setting circuits 12a and 12b are provided individually in the drive circuits 6a and 6b for the switching elements S2a and S2b, respectively, in addition to the circulating current drive on the low-loss side explained in the fourth embodiment, circulating current drive on a high-speed operation side is possible. In other words, when only the switching elements S2a and S2b are used while the switching elements S1a and S1b are kept in the OFF operation state, ON times of the switching elements S2a and S2b can be changed to realize a load balance of the elements. As a result, even when only switching elements on the high-speed operation side are used, it is possible to adjust output current energy to some extent. Machining current energy can be adjusted appropriately even at the time when a thin wire of φ0.2 millimeters or less with a small discharge current allowance is used and at the time of finishing when a large current cannot be inputted.

Note that a delay never occurs in a drive response operation due to ON time setting for the drive circuits 6a and 6b by the machining current ON time setting circuits 12a and 12b. Although an example of application to the fourth embodiment is described in the sixth embodiment, it is needless to mention that the sixth embodiment can be applied to the fifth embodiment in the same manner.

Figure 19:
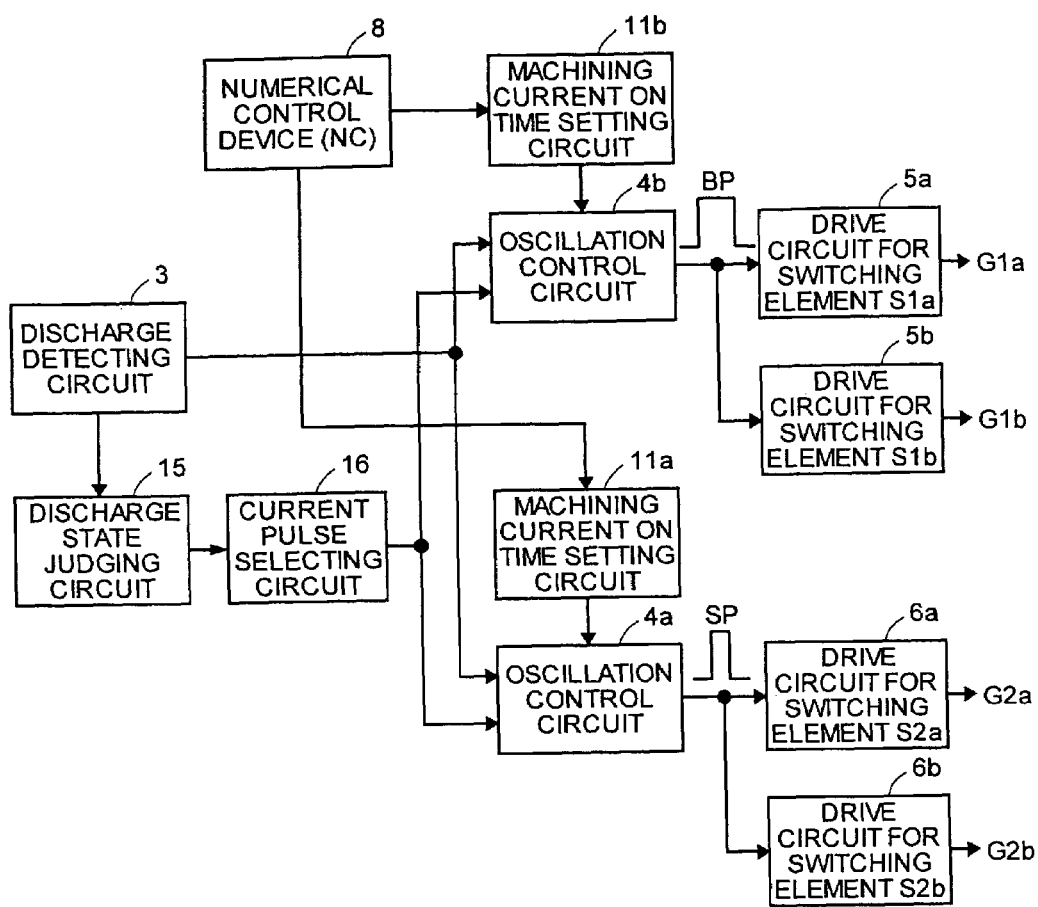
FIG. 19 is a block diagram of a structure of a power supply control circuit included in a power supply device for electric discharge machining that is a seventh embodiment of the present invention.

FIG. 19 is a block diagram of a structure of a power supply control circuit included in a power supply device for electric discharge machining that is a seventh embodiment of the present invention. Note that, in FIG. 19, components identical with or equivalent to the components described in the fourth embodiment (FIG. 14) are denoted by the identical reference numerals and signs. Here, parts related to the sixth embodiment will be mainly explained.

In short, the power supply control circuit according to the seventh embodiment is a circuit that controls to drive the switching elements S1a, S1b, S2a, and S2b in the power supply device for electric discharge machining described in the first embodiment (FIG. 1). The seventh embodiment describes an example (first example) of a structure at the time when a current pulse to be supplied to an inter-electrode portion is switched to a current pulse with a large current peak and a current pulse with a small current peak according to a discharge state at discharge start time.

As shown in FIG. 19, a connection relation is different from the connection relation shown in FIG. 14. As components, a discharge state judging circuit 15 and a current pulse selecting circuit 16 are added in the structure described in the fourth embodiment (FIG. 14).

In FIG. 19, an output of the discharge detecting circuit 3 is given to the oscillation control circuits 4a and 4b and is also given to the discharge state judging circuit 15. An output of the discharge state judging circuit 15 is given to the current pulse selecting circuit 16, and an output of the current pulse selecting circuit 16 is given to the oscillation control circuits 4a and 4b. A connection relation among the oscillation control circuit 4a and 4b, the numerical control device 8, and the machining current ON time setting circuits 11a and 11b is the same as that in the structure shown in FIG. 14. However, an output of the oscillation control circuit 4b (the control pulse signal P2) is given to the drive circuits 5a and 5b, and an output of the oscillation control circuit 4a (the control pulse signal P1) is given to the drive circuits 6a and 6b. As explained in the fourth embodiment (FIG. 14), the oscillation control circuit 4b generates a control pulse signal BP with a large pulse width, and the oscillation control circuit 4a generates a control pulse signal SP with a small pulse width.

The discharge state judging circuit 15 processes information of preliminary discharge detected by the discharge detecting circuit 3 to thereby judge whether a discharge state of the inter-electrode portion is a normal discharge state in which a large current is applied or an immediate discharge state or a short circuit state in which a repetition frequency is high. The current pulse selecting circuit 16 receives a result of the judgment of the discharge state judging circuit 15 and selects which of the oscillation control circuits 4a and 4b an oscillation instruction is outputted to. More specifically, the current pulse selecting circuit 16 is adapted to output an oscillation instruction to the oscillation control circuit 4b when the result of the judgment of the discharge state judging circuit 15 indicates the normal discharge state and outputs an oscillation instruction to the oscillation control circuit 4a when the result of the judgment indicates the immediate discharge state or the short circuit state.

Figure 20:
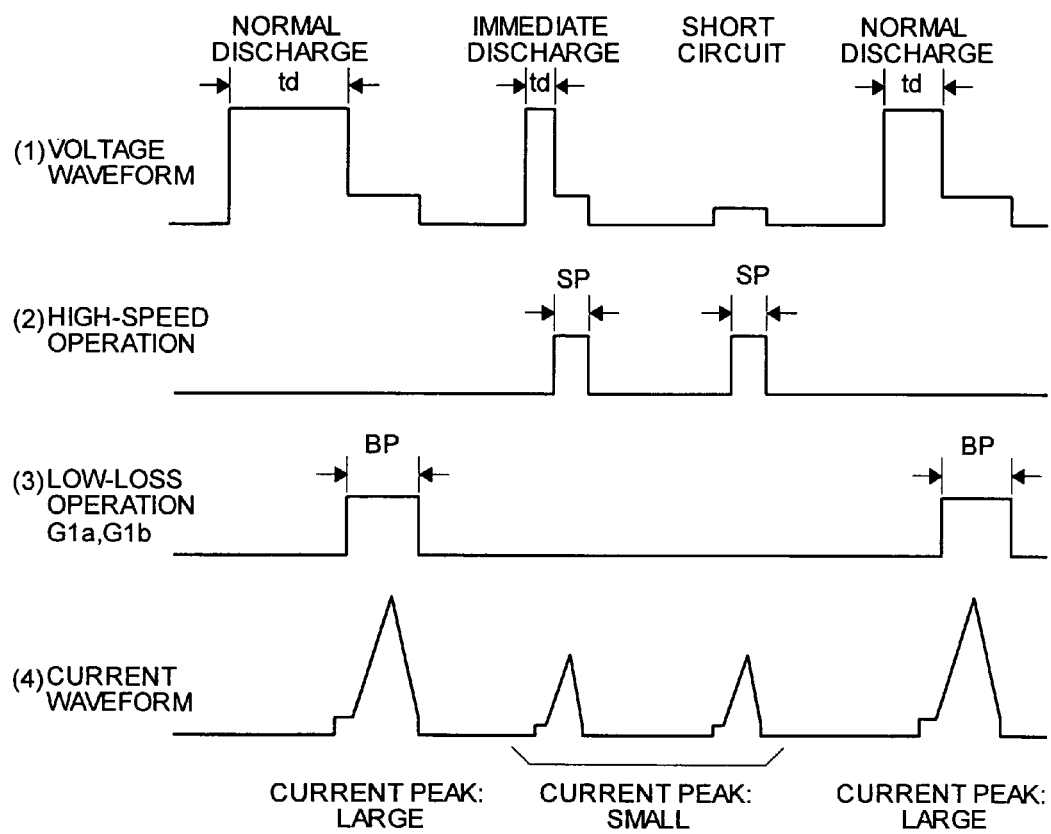
FIG. 20 is a diagram explaining a principle of operation of the power supply device for electric discharge machining by the power supply control circuit shown in FIG. 19.

Next, operations of the power supply device for electric discharge machining according to the seventh embodiment will be explained with reference to FIGS. 19 and 20. Note that FIG. 20 is a diagram explaining a principle of operation of the power supply device for electric discharge machining by the power supply control circuit shown in FIG. 19. Here, in FIG. 20, reference sign td denotes a no-load time. (1) indicates an example of a voltage waveform with which the discharge state judging circuit 15 judges the respective states of the normal discharge state, the immediate discharge state, and the short circuit state. Here, an example in which the discharge state judging circuit 15 judges the states according to a length of the no-load time td is described. (2) indicates timing for generating the control pulse signal SP for driving the switching elements S2a and S2b. (3) indicates timing for generating the control pulse signal BP for driving the switching elements S1a and S1b. (4) indicates a waveform of a current pulse that is supplied to the inter-electrode portion.

First, in the machining current ON time setting circuit 11a and 11b, pulse widths of the control pulse signals SP and BP are set in advance as one parameter of machining conditions for wire electric discharge machining through the numerical control device 8, respectively. As described above, the pulse widths of the control pulse signals SP and BP are set in a relation of BP>SP. This is decided from the viewpoint of machining speed and prevention of wire breakage.

When an interval of preliminary discharge detected by the discharge detecting circuit 3 is wide and the no-load time td is longer than about 1 microsecond to 2 microseconds, the discharge state judging circuit 15 judges that normal discharge has occurred. On the other hand, when an interval of preliminary discharge detected by the discharge detecting circuit 3 is narrow and the no-load time is shorter than 1 microsecond to 2 microseconds, the discharge state judging circuit 15 judges that short circuit or immediate discharge has occurred.

When a result of the judgment of the discharge state judging circuit 15 indicates the immediate discharge state or the short circuit state, the current pulse selecting circuit 16 outputs an oscillation instruction to the oscillation control circuit 4a. As a result, gate drive signals G2a and G2b for driving the switching elements S2a and S2b for a high-speed operation are generated by the control pulse signal SP with a small pulse width, the switching elements S2a and S2b perform an ON operation in the pulse width of the control pulse signal SP, and a current pulse with a small current peak is supplied to the inter-electrode portion in the immediate discharge state or the short circuit state as shown in (4) in FIG. 20.

In addition, when a result of the judgment of the discharge state judging circuit 15 indicates the normal discharge state, the current pulse selecting circuit 16 outputs an oscillation instruction to the oscillation control circuit 4b. As a result, gate drive signals G1a and G1b for driving the switching elements S1a and S1b for a low-loss operation are generated by the control pulse signal BP with a large pulse width, the switching elements S1a and S1b perform an ON operation in the pulse width of the control pulse signal BP, and a current pulse with a large current peak is supplied to the inter-electrode portion in the normal discharge state as shown in (4) in FIG. 20.

In this way, when normal discharge occurs, a large current peak is supplied to the inter-electrode portion by the control pulse signal BP with a large pulse width, and when short circuit or immediate discharge occurs, a small current peak is supplied to the inter-electrode portion by the control pulse signal SP with a small pulse width. At this point, when the large current peak is supplied, the switching elements S1a and S1b excellent in a low-loss characteristic are selected, and when the small current peak is supplied, the switching elements S2a and S2b excellent in a high-speed operation characteristic are selected.

As described above, in the wire electric discharge machining, since a ratio of generation of normal discharge is about ⅓ to ½ in a state in which a discharge frequency is high, even if the discharge frequency is 100 kilohertz, an occurrence frequency of normal discharge requiring a large current peak is equal to or lower than 50 kilohertz. Thus, in the seventh embodiment, when a current pulse to be supplied is switched according to a discharge state at discharge start time of the inter-electrode portion, at the time of occurrence of normal discharge unsuitable for a high-frequency operation, a large current peak can be supplied using the switching elements S1a and S1b that are low loss. On the other hand, in a state like short circuit or immediate discharge in which a no-load time is extremely short and a discharge cycle is high but a large current peak cannot be applied in terms of a discharge phenomenon, a small current peak can be supplied using the switching elements S2a and S2b that are excellent in a high-speed operation and capable of coping with a high-frequency operation.

Therefore, it is possible to realize high-speed machining attaining both a large current and a high-speed operation. In addition, since switching circuits with different characteristics are used in combination, the number of switching elements can be reduced, and a heat value can be reduced. Moreover, since a repetition frequency of switching circuits on the low-loss side can be controlled to ½ to ⅓, it is possible to use a large-current and low-loss element (IGBT, etc.).

Figure 21:
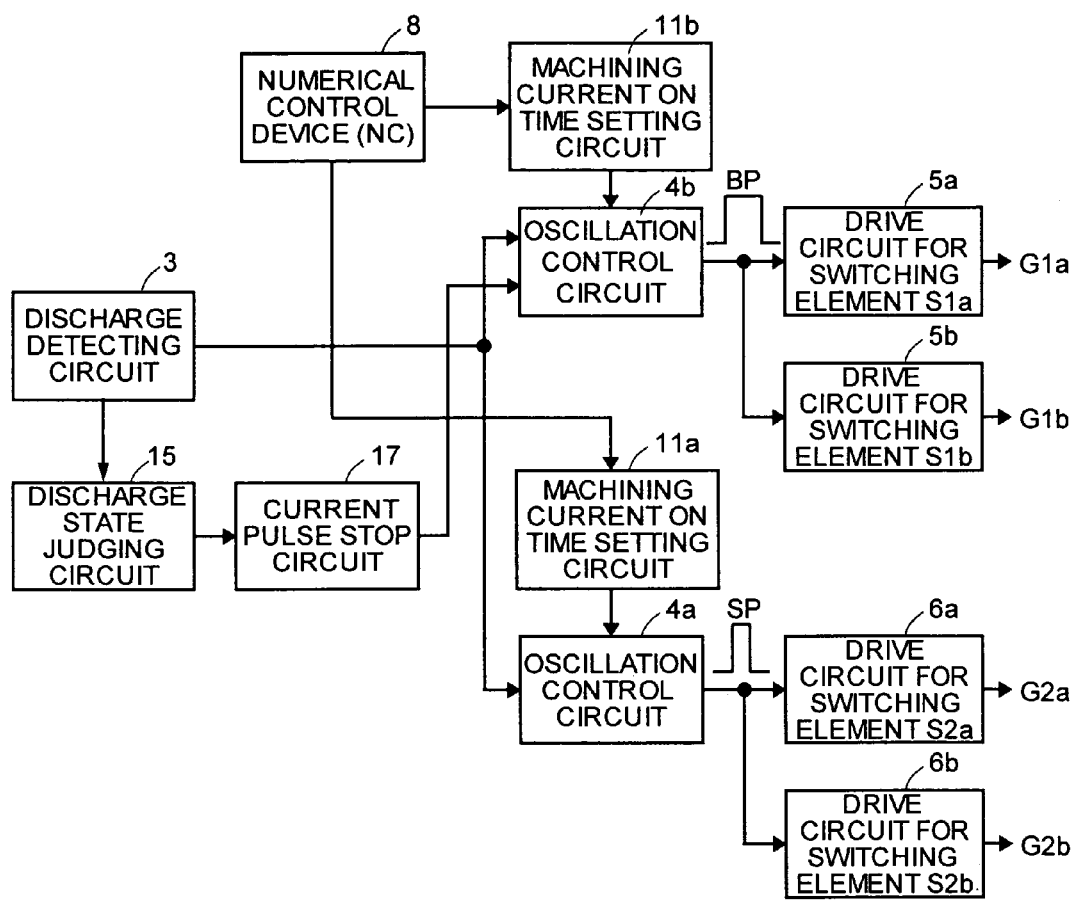
FIG. 21 is a block diagram of a structure of a power supply control circuit included in a power supply device for electric discharge machining that is an eighth embodiment of the present invention.

FIG. 21 is a block diagram of a structure of a power supply control circuit included in a power supply device for electric discharge machining that is an eighth embodiment of the present invention. Note that, in FIG. 21, components identical with or equivalent to the components described in the seventh embodiment (FIG. 19) are denoted by the identical reference numerals and signs. Here, parts related to the seventh embodiment will be mainly explained.

In short, the power supply control circuit according to the eighth embodiment is a circuit that controls to drive the switching elements S1a, S1b, S2a, and S2b in the power supply device for electric discharge machining described in the first embodiment (FIG. 1). The eighth embodiment describes an example (second example) of a structure at the time when a current pulse to be supplied to an inter-electrode portion is switched to a current pulse with a large current peak and a current pulse with a small current peak according to a discharge state (normal discharge, immediate discharge, or short circuit) at discharge start time.

As shown in FIG. 21, in the structure described in the seventh embodiment (FIG. 19), a current pulse stop circuit 17 is provided instead of the current pulse selecting circuit 16. However, an output of the current pulse stop circuit 17 is given to only the oscillation control circuit 4b. When a result of judgment of the discharge state judging circuit 15 indicates the immediate discharge state or the short circuit state, the current pulse stop circuit 17 outputs an oscillation stop instruction to the oscillation control circuit 4b. When a result of judgment of the discharge state judging circuit 15 indicates normal discharge, the current pulse stop circuit 17 performs nothing.

Figure 22:
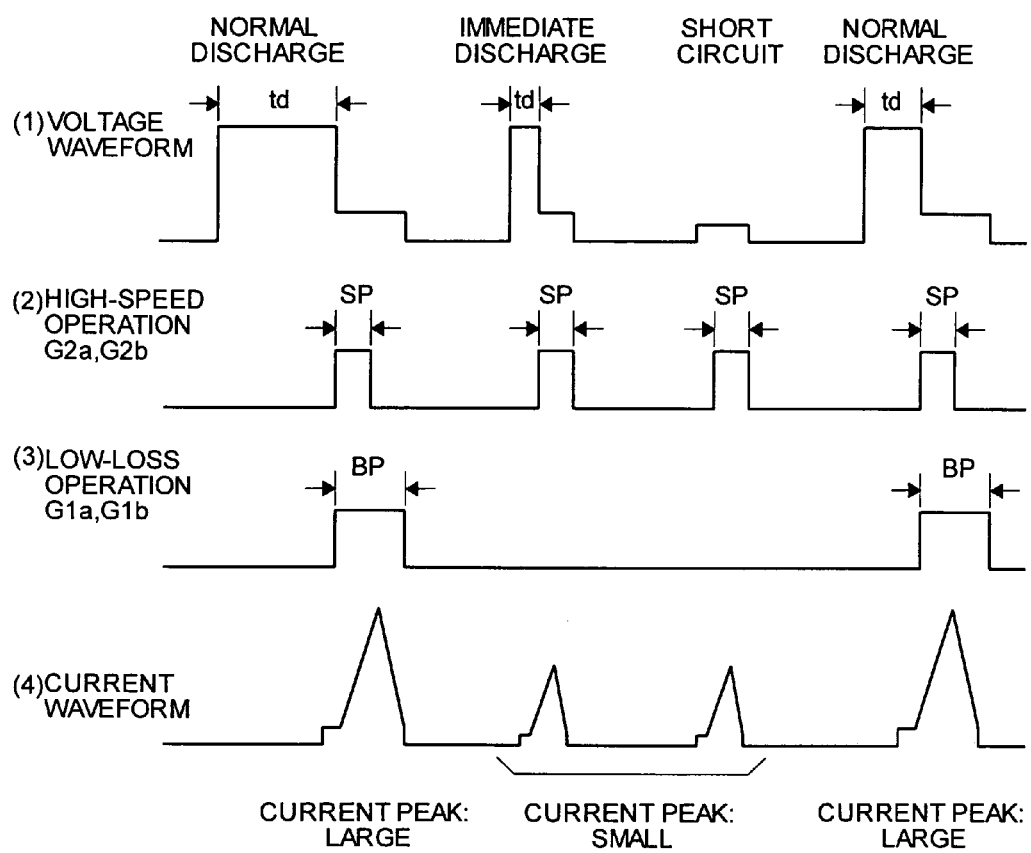
FIG. 22 is a diagram explaining a principle of operation of the power supply device for electric discharge machining by the power supply control circuit shown in FIG. 21.

Next, operations of the power supply device for electric discharge machining according to the eighth embodiment will be explained with reference to FIG. 22. Note that FIG. 22 is a diagram explaining a principle of operation of the power supply device for electric discharge machining by the power supply circuit shown in FIG. 21. Contents of respective items in FIG. 22 are as explained in FIG. 20.

When an interval of preliminary discharge detected by the discharge detecting circuit 3 is wide and the no-load time td is longer than about 1 microsecond to 2 microseconds, the discharge state judging circuit 15 judges that normal discharge has occurred. On the other hand, when an interval of preliminary discharge detected by the discharge detecting circuit 3 is narrow and the no-load time is shorter than 1 microsecond to 2 microseconds, the discharge state judging circuit 15 judges that short circuit or immediate discharge has occurred.

When a result of the judgment of the discharge state judging circuit 15 indicates the immediate discharge state or the short circuit state, the current pulse stop circuit 17 outputs an oscillation stop instruction to the oscillation control circuit 4b. Therefore, when a state of the preliminary discharge detected by the discharge detecting circuit 3 is normal discharge, the oscillation control circuits 4a and 4b operates sequentially as explained in the fourth embodiment (FIG. 14). Thus, the switching elements S1a and S1b of a low loss and the switching elements S2a and S2b excellent in a high-speed operation are sequentially driven.

On the other hand, when a state of the preliminary discharge detected by the discharge detecting circuit 3 is the immediate discharge state or the short circuit state, only the oscillation control circuit 4a operates, and only the switching elements S2a and S2b excellent in a high-speed operation are driven.

As a result, as shown in FIG. 22, when normal discharge occurs in the inter-electrode portion, a large current peak according to the control pulse signal BP and a small current peak according to the control pulse signal SP are supplied. On the other hand, when short circuit or immediate discharge occurs in the inter-electrode portion, a small current peak according to the control pulse signal SP is supplied.

As described above, in the eighth embodiment, when an electric pulse to be supplied is switched according to a discharge state at discharge start time in the inter-electrode portion, supply of a large current peak using the switching elements S1a and S1b that are low loss and supply of small current peak using the switching elements S2a and S2b excellent in a high-speed response are sequentially selected when normal discharge unsuitable for a high-frequency operation occurs. On the other hand, in a state like short circuit or immediate discharge in which a no-load time is extremely short and a discharge cycle is high but a large current peak cannot be applied in terms of a discharge phenomenon, operations of the low-loss switching elements S1a and S1b are stopped, such that a small current peak can be supplied using only the switching elements S2a and S2b that are excellent in a high-speed operation and capable of coping with a high-frequency operation.

Therefore, high-speed machining attaining both a large current operation and a high-speed operation is realized, and in addition, it is possible to perform stable high-speed machining without arc cut-off. Further, the same actions and effects as those in the seventh embodiment are obtained.

INDUSTRIAL APPLICABILITY

The present invention is preferably used as a power supply device for electric discharge machining for a wire electric discharge machine that performs wire electric discharge machining at a large current and high speed.

The invention claimed is:

1. A power supply device for electric discharge machining comprising:
   a switching unit that supplies a discharge pulse current to an inter-electrode portion between an electrode and a workpiece serving as another electrode arranged to be opposed to the electrode at a predetermined interval; and
   a pulse width control unit that generates a control pulse signal of a predetermined pulse width in response to a detection signal for starting a discharge in the inter-electrode portion,
   wherein the switching unit comprises
      a first switching circuit comprising a first switching element suitable for a high-speed operation that performs a switching operation according to a first drive pulse signal generated in response to the control pulse signal; and
      a second switching circuit comprising a second switching element suitable for a low-speed operation that performs the switching operation with an overlapping period after operation start of the first switching circuit according to a second drive pulse signal generated in response to the control pulse signal, and
   wheren the first switching circuit and the second switching circuit receive the control pulse signal in parallel.

2. The power supply device for electric discharge machining according to claim 1, wherein
   the first switching circuit further comprises at least one of the switching element suitable for the high-speed operation that perform the switching operation according to the first drive pulse signal generated in response to the detection signal for starting the discharge and the second switching element suitable for the low-speed operation; and
   the second switching circuit further comprises the second switching element suitable for the low-speed operation that performs the switching operation overlapped with an operation time of the first switching circuit according to the second drive pulse signal generated in response to the control pulse signal.

3. The power supply device for electric discharge machining according to claim 2, wherein the pulse-width control unit comprises:
   a first setting unit that generates the control pulse signal that is set to a first pulse width giving a period in which one of opposed switching elements comes into a conductive state, and gives the control pulse signal to a drive unit of the one of the opposed switching elements; and
   a second setting unit that generates the control pulse signal that is set to a second pulse width giving a period in which other of the opposed switching elements comes into a conductive state, and gives the control pulse signal to a drive unit of the other of the opposed switching elements.

4. The power supply device for electric discharge machining according to claim 2, wherein the pulse-width control unit comprises:
   a setting unit that generates the control pulse signal that is set to a first pulse width;
   an extension unit that extends the first pulse width to produce a second pulse width, and outputs the control pulse signal of the second pulse width; and
   a control pulse switching unit that switches the control pulse signal having the first pulse width and the control pulse signal having the second pulse width, and outputs the control signal to a drive unit, which drives opposed switching elements according to an instruction, wherein the control pulse signal has a pulse width that brings the respective switching elements into a conductive state.

5. The power supply device for electric discharge machining according to claim 2, wherein:
   the pulse-width control unit comprises:
      a first setting unit that generates the control pulse signal that is set to a first pulse width;

an extension unit that extends the first pulse width to produce a second pulse width, and outputs the control pulse signal of the second pulse width;

a pulse-width switching unit that switches the control pulse signal having the first pulse width and the control pulse signal having the second pulse width, and outputs the control signal to a drive unit, which drives opposed switching elements according to an instruction, wherein the control pulse signal has a pulse width that brings the respective switching elements into a conductive state; and a second setting unit that sets a pulse width giving a period in which respective switching elements opposed to each other in the first switching circuit are brought into a conductive state, and the drive unit that drives the respective switching elements opposed to each other in the first switching circuit receives the detection signal for starting the discharge, and generate a drive pulse signal having the pulse width set by the second setting unit to drive the respective switching elements.

6. The power supply device for electric discharge machining according to claim 1, wherein the switching unit further comprises the first switching circuit comprising the first switching element suitable for the high-speed operation that performs the switching operation according to a drive pulse signal generated in response to the detection signal for starting the discharge; and the second switching circuit comprising the second switching element suitable for the low-speed operation that are controlled to perform the switching operation overlapped with an operation time of the first switching circuit after the switching operation of the first switching circuit is started, and wherein the pulse width control unit controls the pulse width of the control pulse signal to be different from each other between switching elements opposed to each other in the second switching circuit.

7. The power supply device for electric discharge machining according to claim 1, further comprising a pulse-width setting unit that performs setting for changing a pulse width of the control pulse signal before starting the discharge.

8. A power supply device for electric discharge machining comprising:

a switching unit that supplies a discharge pulse current to an inter-electrode portion that is a portion between an electrode and a workpiece serving as another electrode arranged to be opposed to the electrode at a predetermined interval; and a pulse-width control unit that generates a control pulse signal of a predetermined pulse width in response to a detection signal for starting a discharge at the inter-electrode portion, wherein the switching unit comprises a first switching circuit comprising a first switching element suitable for a high-speed operation; and a second switching circuit including a second switching element suitable for a low-speed operation, where the first and second switching circuits receive the control pulse signal in parallel, third switching circuit that receives a detection signal for discharge start in the inter-electrode portion and comprises one of the first switching element suitable for the high-speed operation and the second switching element suitable for the low-speed operation; and a fourth switching circuit that receives a control pulse signal of a predetermined pulse width generated in response to the discharge start and comprises the second switching element suitable for the low-speed operation.

9. The power supply device for electric discharge machining according to claim 8, wherein when the third switching circuit comprises the first switching element suitable for the high-speed operation, the detection signal for starting the discharge is directly applied to a control terminal of the first switching element suitable for the high-speed operation.

10. The power supply device for electric discharge machining according to claim 8, wherein the third switching circuit comprises:

a plurality of drive circuits that receives the detection signal for starting the discharge, and generates a drive pulse signal of a different pulse width; and a selection circuit that selects a drive pulse signal from one of the drive circuits, and applies the selected drive pulse signal to a control terminal of a respective switching element based on an instruction.

11. The power supply device for electric discharge machining according to claim 8, further comprising a pulse-width setting unit that performs setting for changing a pulse width of the control pulse signal before starting the discharge.

12. A power supply device for electric discharge machining comprising:

a first pulse-width control unit and a second pulse-width control unit that generate a control pulse signal of a first pulse width and a control pulse signal of a second pulse width, respectively, in response to starting of a discharge in an inter-electrode portion that is a portion between an electrode and a workpiece serving as another electrode arranged to be opposed to the electrode at a predetermined interval;

a first switching circuit that receives the control pulse signal of the first pulse width and supplies a discharge pulse current to the inter-electrode portion, the first switching circuit comprises a first switching element suitable for a low-speed operation;

a second switching circuit that receives the control pulse signal of the second pulse width and supplies a discharge pulse current to the inter-electrode portion, the second switching circuit comprises a second switching element suitable for a high-speed operation;

a discharge-state judging unit that judges a discharge state at a time of starting the discharge in the inter-electrode portion from among a normal discharge state, an immediate discharge state, and a short circuit state; and a current-pulse selecting unit that issues an output instruction to the first pulse-width control unit when the discharge-state judging unit judges that the discharge state is the normal discharge state, and issues an output instruction to the second pulse-width control unit when the discharge-state judging unit judges that the discharge state is one of the immediate discharge state and the short circuit state.

13. The power supply device for electric discharge machining according to claim 12, further comprising a pulse-width setting unit that performs setting for changing a pulse width of the control pulse signal before starting the discharge.

14. A power supply device for electric discharge machining comprising:

a first pulse-width control unit and a second pulse-width control unit that generate a control pulse signal of a first pulse width and a control pulse signal of a second pulse width, respectively, in response to starting of a discharge in an inter-electrode portion that is a portion between an electrode and a workpiece serving as another electrode arranged to be opposed to the electrode at a predetermined interval;

a first switching circuit that receives the control pulse signal of the first pulse width and supplies a discharge pulse current to the inter-electrode portion, the first switching circuit comprises a first switching element suitable for a low-speed operation;

a second switching circuit that receives the control pulse signal of the second pulse width and supplies a discharge pulse current to the inter-electrode portion, the second switching circuit comprises a second switching element suitable for a high-speed operation;

a discharge-state judging unit that judges a discharge state at a time of starting the discharge in the inter-electrode portion from among a normal discharge state, an immediate discharge state, and a short circuit state; and a current-pulse stop unit that issues an output stop instruction to the first pulse-width control unit when the discharge-state judging unit judges that the discharge state is one of the immediate discharge state and the short circuit state.

15. The power supply device for electric discharge machining according to claim 14, further comprising a pulse-width setting unit that performs setting for changing a pulse width of the control pulse signal before starting the discharge.

* * * * *